US007003666B1

(12) United States Patent
Inoue et al.

(10) Patent No.: US 7,003,666 B1
(45) Date of Patent: Feb. 21, 2006

(54) APPARATUS AND METHOD FOR EMBEDDING INFORMATION FOR TAMPER DETECTION AND DETECTING TAMPER AND RECORDING MEDIUM HAVING PROGRAM FOR CARRYING OUT THE METHOD RECORDED THEREON

(75) Inventors: Hisashi Inoue, Fukuoka (JP); Takashi Katsura, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 772 days.

(21) Appl. No.: 09/716,221

(22) Filed: Nov. 21, 2000

(30) Foreign Application Priority Data

Nov. 25, 1999 (JP) ................................. 11-333775

(51) Int. Cl.
H04L 9/00 (2006.01)
H04L 9/32 (2006.01)
(52) U.S. Cl. ...................................... 713/176; 713/194
(58) Field of Classification Search ................ 382/100; 713/176

See application file for complete search history.

(56) References Cited

U.S. PATENT DOCUMENTS

| | | | | |
|---|---|---|---|---|
| 5,412,741 | A | * | 5/1995 | Shapiro ....................... 382/232 |
| 5,859,920 | A | * | 1/1999 | Daly et al. .................. 382/115 |
| 5,915,027 | A | * | 6/1999 | Cox et al. ..................... 380/54 |
| 6,047,374 | A | * | 4/2000 | Barton ........................ 713/150 |
| 6,065,119 | A | * | 5/2000 | Sandford et al. ........... 713/200 |
| 6,185,312 | B1 | * | 2/2001 | Nakamura et al. .......... 382/100 |
| 6,249,870 | B1 | * | 6/2001 | Kobayashi et al. ......... 713/176 |
| 6,434,538 | B1 | * | 8/2002 | Ibaraki et al. ................ 705/57 |

(Continued)

FOREIGN PATENT DOCUMENTS

EP 0 891 071 1/1999

(Continued)

OTHER PUBLICATIONS

Ziang-Gen Xia et al., "A Multiresolution Watermark for Digital Images", Image Processing, 1997, proceedings, International Conference on Santa Barbara, CA, USA Oct. 26-29, 1997, pp. 548-551, XP010254229, Oct. 26, 1997.

(Continued)

Primary Examiner—Ayaz Sheikh
Assistant Examiner—Pramila Parthasarathy
(74) Attorney, Agent, or Firm—Wenderoth, Lind & Ponack, L.L.P.

(57) ABSTRACT

An object of the present invention is to provide an information embedding/tamper detecting apparatus and method capable of distinguishing between changes caused by image processing and intentional image tampering, and further capable of localizing, on a regional basis, a tampered position on an image. A tamper-detection-information embedding apparatus 1 divides the image into a plurality of frequency bands to obtain transform coefficients, and then generates a pseudo-random number series by using key data, and further generates authentication data. The key data and the authentication data are embedded in the transform coefficients of MRA and MRR, respectively. the image in which the information is embedded is reconstructed by using MRA and MRR. A tamper-detecting apparatus 2 extracts the key data from MRA obtained by dividing the image into frequency bands and generates the authentication data assumed to have been embedded, and further extracts the embedded information from MRR. The image is divided in to a plurality of blocks composed of a predetermined number of pixels. For each block, an information series embedded in the transform coefficients of MRR representing the same spatial region as the unit block is compared, for verification, with the corresponding authentication data series so that the tamper is determined on a regional basis.

9 Claims, 14 Drawing Sheets

U.S. PATENT DOCUMENTS 6,453,053 B1 *  9/2002  Wakasu ........................ 382/100
6,470,090 B1 * 10/2002  Oami et al. .................. 382/100
6,639,997 B1 * 10/2003  Katsura et al. .............. 382/100

FOREIGN PATENT DOCUMENTS

| JP | 11-194709 | 7/1999 |
| JP | 11-196262 | 7/1999 |
| JP | 11-196392 | 7/1999 |
| JP | 11-341268 | 12/1999 |

OTHER PUBLICATIONS

*Proceedings of the IEEE*, "Digital Watmarking for Telltale Tamper Proofing and Authentication", vol. 87, No. 7, Jul. 1999, pp. 1167-1180.

* cited by examiner

DIGITAL IMAGE SIGNAL

F I G. 1 2
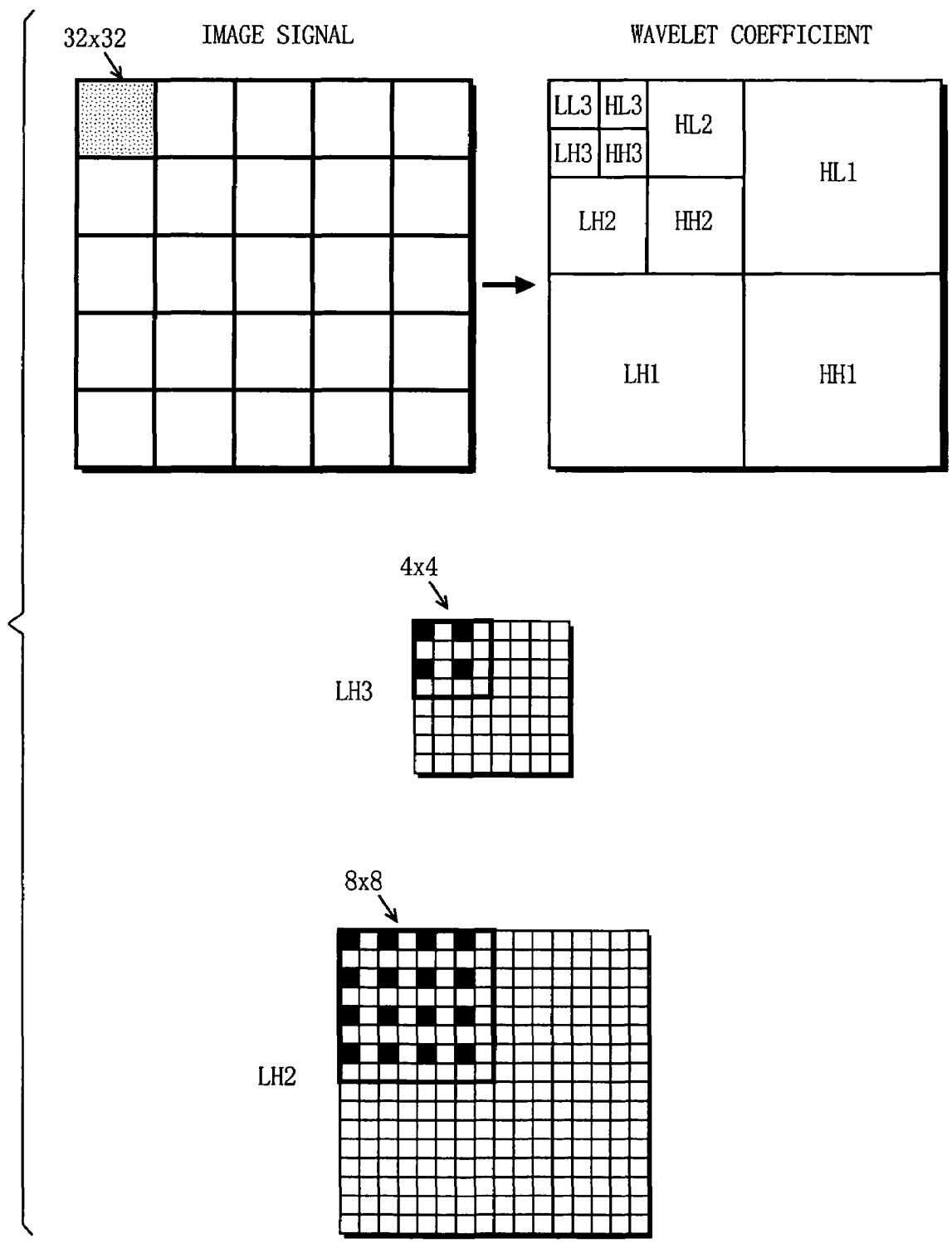

FIG. 13

$0 \times 0 = 0$ $0 \times 1 = 1$ $1 \times 0 = 1$ $1 \times 1 = 0$

APPARATUS AND METHOD FOR EMBEDDING INFORMATION FOR TAMPER DETECTION AND DETECTING TAMPER AND RECORDING MEDIUM HAVING PROGRAM FOR CARRYING OUT THE METHOD RECORDED THEREON

BACKGROUND OF THE INVENTION

1. Field of the Invention

The present invention relates to an apparatus and a method for embedding information for tamper detection and detecting tampering, and a recording medium having a program for carrying out the method recorded thereon. More specifically, the present invention relates to an apparatus for embedding authentication data for tamper detection in a digital image signal, extracting embedded data therefrom to detect any partial change in the digital image and localizing its position, a method carried out by the apparatus, and a recording medium having a program for carrying out the method recorded thereon.

2. Description of the Background Art

Recently, more and more information are available through the use of the Internet. Especially, WWW (World Wide Web) is being frequently used for transmitting and receiving information including images and audio. Under such a network environment opened for everyone, however, an indefinite number of people can copy digital information such as an image without difficulty. Further, the copied image can be easily edited or processed by image processing software available. Accordingly, there may be a case that a recipient of the digital image is not aware of any tampering therewith that may have been made by a third party during the transmission.

Therefore, immediate establishment is required of a technique capable of determining whether the transmitted digital image has been tampered with or not. An electronic authentication technique has been conventionally known as one of the solutions.

FIG. 14 is a diagram explaining an outline of the procedure of a conventional electronic authentication.

A transmitting side subjects an original digital image to data compression by a hash function to generate a digest of the digital image, and then encrypts the digest with a secret key predetermined by the transmitting side. The transmitting side transmits the original digital image and the encrypted digest to a receiving side over the network.

Similarly to the transmitting side, the receiving side first subjects the digital image received over the network to data compression by the hash function to generate a digest of the received digital image. The receiving side also decrypts the encrypted digest received over the network with a public key predetermined by the transmitting side. The receiving side compares the digest generated from the digital image with the decrypted digest. If the digests are identical with each other, the receiving side determines that the digital image has not been tampered with, and if not identical, determines that the digital image has been tampered with (electronic authentication).

In the conventional electronic authentication, however, the transmitting side needs to transmit two types of data, i.e., the original digital image and the encrypted digest, to the receiving side. If there are many digital images, the transmitting side indispensably needs to manage which digest is for which digital image in order to correctly transmit such two types of data over the network.

To avoid such management in the electronic authentication, (i.e., to avoid transmission of two types of data), a digital watermarking technique has been conventionally applied. The digital watermarking is a technique for embedding digital information in digital image data in an insensible form for human being. A typical prior art which relates to the electronic authentication applying the digital watermarking technique is disclosed in, for example, the document "PROCEEDINGS OF THE IEEE, VOL. 87, NO. 7, JULY 1999, pp. 1167 to 1180".

Now, described is a case of applying the digital watermarking technique to the aforementioned electronic authentication using the digests.

The transmitting side generates a digest of a digital image only for a predetermined number of high-order bits of the digital image (pixels). Thereafter, the transmitting side encrypts the digest with a secret key predetermined by a transmitting side, and embeds the encrypted digest in low-order bits of the digital image. The transmitting side then transmits the digest-embedded digital image to the receiving side over the network.

The receiving side extracts the encrypted digest embedded in the low-order bits of the digital image received over the network. The receiving side decrypts the extracted digest with a public key predetermined by the transmitting side. The receiving side also generates a digest, for verification, only for the predetermined number of high-order bits of the received digital image. The receiving side compares the generated digest with the decrypted digest. If the digests are identical with each other, the receiving side determines that the digital image has not been tampered with, and if not identical, determines that the digital image has been tampered with.

With the conventional digital watermarking technique, however, it is possible to know that the digital image has been changed during its transmission, but can not localize the position that has been changed.

Further, with the conventional digital watermarking technique, specific information is embedded utilizing-high-frequency components which are normally insensible to human eyes. For this reason, if the digital image is subjected to irreversible image processing (compression and decompression) such as JPEG after being embedded with the information, such information is varied, making it impossible to extract the information correctly. That means that distinction is not possible between the tampering intentionally made by an unauthorized person and the change unintentionally caused by the ordinary irreversible image processing.

Still further, the high frequency components normally corresponds to an edge and texture part of an image. Accordingly, if the image is much composed of a monotonous part (image with little contrast variation), the information is not evenly embedded in the image (screen). As a result, a tampering with such monotonous part may not be detected.

SUMMARY OF THE INVENTION

Therefore, an object of the present invention is to provide an apparatus for embedding information for tamper detection and detecting tampering that embeds specific information not only in high frequency components but in an entire image, i.e., in transform coefficients of relatively low frequency components, and later extracts the embedded information, a method carried out by such apparatus, and a recording medium having a program for carrying out the method recorded thereon. Therefore, it is possible to distinguish an intentional image tampering from a change unintentionally caused by irreversible image processing and further localize a tampered position.

The present invention has the following features to achieve the object above.

A first aspect of the present invention is directed to an apparatus for embedding predetermined information for tamper detection in a digital image signal, comprising:

a band division portion for dividing the digital image signal into a plurality of frequency bands;

an authentication data generation portion for generating a pseudo-random number series by using predetermined key data, and generating authentication data from the pseudo-random number series;

a key data embedding portion for embedding the key data in transform coefficients of a lowest frequency band (MRA) among the plurality of frequency bands;

an authentication data embedding portion for embedding authentication data in transform coefficients of the frequency bands exclusive of MRA (MRR) among the plurality of frequency bands; and a band synthesis portion for reconstructing the digital image signal in which the information has been embedded by using MRA and MRR to which data embedding processing is subjected.

As described above, in the first aspect, a digital image signal is hierarchically divided into frequency bands, and then the authentication data is embedded in the transform coefficients of MRR. The authentication data is generated from a pseudo-random number series by using the key data, and the key data is embedded in the transform coefficients of MRA. As such, the information is embedded in the transform coefficients of relatively low frequency components. Accordingly, if the image is subjected to an irreversible image processing, variation in the embedded key data and authentication data is small comparing to that caused by the intentional image tampering. It is therefore possible to distinguish between the changes caused by the irreversible image processing and the intentional image tampering in the tamper detecting apparatus. Further, in the first aspect, it is not easy for a third party to decipher the authentication data because he/she does not know specifics of frequency bands and transform coefficients in which the information is embedded, the order of reading the transform coefficients, and the key data, thereby preventing overwriting or replacement of the embedded information.

Herein, as a preferable method of embedding the authentication data, a set value T (T is a positive integer) and a set value m (m is an integer not more than T) are predetermined and q is predetermined as a value obtained by dividing a transform coefficient is divided by a predetermined quantization step size, and the authentication data embedding portion embeds the authentication data in each transform coefficient of MRR by comparing an absolute value of the transform coefficient with the set value T, and if the absolute value is less than the set value T, setting the transform coefficient to the set value +m or −m depending on a bit value of the authentication data to be embedded, and if the absolute value is not less than the set value T, setting the transform coefficient to an even or odd integer nearest to the value q depending on the bit value of the authentication data to be embedded.

In this manner, information can be embedded with high accuracy and with less deterioration in image quality.

A second aspect of the present invention is directed to an apparatus for detecting tamper with a digital image based on tamper-detection-information embedded by a specific apparatus in a digital image signal, comprising:

a band division portion for dividing the digital image signal into a plurality of frequency bands;

a key data extraction portion for extracting key data embedded by the specific apparatus from transform coefficients of MRA among the plurality of frequency bands;

an authentication data generation portion for generating a pseudo-random number series by using the key data, and generating authentication data from the pseudo-random number series;

an embedded information extraction portion for extracting embedded information embedded based on the key data by the specific apparatus from transform coefficients of MRR among the plurality of frequency bands; and a tamper determination portion for comparing the embedded information with the authentication data for verification and determining whether the digital image has been tampered with.

Further, the tamper determination portion preferably comprises:

a block division portion for dividing the digital image into a plurality of unit blocks each composed of a predetermined number of pixels;

a regional embedded information read portion for reading, for each of the unit blocks, embedded information embedded in the transform coefficients of MRR that represents the same spatial region as the unit block, serially from all of the embedded information extracted by the embedded information extraction portion;

a regional authentication data read portion for reading, for each of the unit blocks, authentication data corresponding in position to the embedded information serially read by the regional embedded information read portion, serially from all of the authentication data generated in the authentication data generation portion; and a block-tamper determination portion for comparing a series of the embedded information serially read with a series of the authentication data serially read and determining, for each of the unit blocks, whether the digital image has been tampered with.

As described above, in the second aspect, the digital image is divided into unit blocks each composed of a predetermined number of pixels. For each unit block, information embedded in the transform coefficients of MRR that represents the same spatial region as the unit block is read. The read information is compared, for verification, with the authentication data assumed to have been embedded in the tamper-detection-information embedding apparatus. In this way, the tampered position on the digital image can be localized on a regional basis of unit block. Further, in the tamper-detection-information embedding apparatus, the information is embedded in the transform coefficients of relatively low frequency components. Accordingly, if the image is subjected to an irreversible image processing, variation in the embedded key data and authentication data is small comparing to that caused by the intentional image tampering. It is therefore possible to distinguish between the changes caused by the irreversible image processing and the intentional image tampering.

Herein, as a preferable method of extracting the authentication data, a set value T (T is a positive integer) is predetermined and q is predetermined as a value obtained by dividing a transform coefficient by a predetermined quantization step size and then rounding off the result, and the embedded information extraction portion extracts the embedded information from each transform coefficient of MRR by comparing an absolute value of the transform coefficient with the set value T, and if the absolute value is less than the set value T, determining whether a value of the transform coefficient is positive or negative and extracting a bit value of embedded information embedded in the transform coefficient based on the determination, and if the absolute value is not less than the set value T, determining whether the value q is even or odd and extracting a bit value of embedded information embedded in the transform coefficient based on the determination.

In this manner, information can be extracted with high accuracy and with less deterioration in image quality.

A third aspect of the present invention is directed to a method of embedding predetermined information for tamper detection in a digital image signal, comprising:

a step of dividing the digital image signal into a plurality of frequency bands;

a step of generating a pseudo-random number series by using predetermined key data, and generating authentication data from the pseudo-random number series;

a step of embedding the key data in transform coefficients of MRA among the plurality of frequency bands;

a step of embedding the authentication data in transform coefficients of the frequency bands of MRR among the plurality of frequency bands; and a step of reconstructing the digital image signal in which the information has been embedded by using MRA and MRR to which data embedding processing is subjected.

As described above, in the third aspect, a digital image signal is hierarchically divided into frequency bands, and then the authentication data is embedded in the transform coefficients of MRR. The authentication data is generated from a pseudo-random number series by using the key data, and the key data is embedded in the transform coefficients of MRA. As such, the information is embedded in the transform coefficients of relatively low frequency components. Accordingly, if the image is subjected to an irreversible image processing, variation in the embedded key data and authentication data is small comparing to that caused by the intentional image tampering. It is therefore possible to distinguish between the intentional image tampering and the change unintentionally caused by irreversible image processing when any tamper is detected. Further, in the third aspect, it is not easy for a third party to decipher the authentication data because he/she does not know specifics of frequency bands and transform coefficients in which the information is embedded, the order of reading the transform coefficients, and the key data, thereby preventing overwriting or replacement of the embedded information.

Herein, as a preferable method of embedding authentication data, a set value T and a set value m are predetermined and q is predetermined as a value obtained by dividing a transform coefficient by a predetermined quantization step size, and the step of embedding authentication data includes:

a step of comparing an absolute value of the transform coefficient with the set value T;

a step of setting the transform coefficient to the set value +m or −m depending on a bit value of the authentication data to be embedded if the absolute value is less than the set value T; and a step of setting the transform coefficient to an even or odd integer nearest to the value q depending on the bit value of the authentication data to be embedded if the absolute value is not less than the set value T.

In this manner, information can be embedded with high accuracy and with less deterioration in image quality.

A fourth aspect of the present invention is directed to a method of detecting tamper with a digital image based on tamper-detection-information embedded by a specific apparatus in a digital image signal, comprising:

a step of dividing the digital image signal into a plurality of frequency bands;

a step of extracting key data embedded by the specific apparatus from transform coefficients of MRA among the plurality of frequency bands;

a step of generating a pseudo-random number series by using the key data, and generating authentication data from the pseudo-random number series;

a step of extracting embedded information embedded based on the key data by the specific apparatus from transform coefficients of MRR among the plurality of frequency bands; and a step of comparing the embedded information with the authentication data for verification and determining whether the digital image has been tampered with.

Further, the step of determining tamper preferably includes:

a step of dividing the digital image into a plurality of unit blocks each composed of a predetermined number of pixels;

a step of reading, for each of the unit blocks, embedded information embedded in MRR that represents the same spatial region as the unit block, serially from all of the embedded information;

a step of reading, for each of the unit blocks, authentication data corresponding in position to the embedded information serially read, serially from all of the authentication data; and a step of comparing a series of the embedded information serially read with a series of the authentication data serially read and determining, for each of the unit blocks, whether the digital image has been tampered with.

As described above, in the fourth aspect, the digital image is divided into unit blocks each composed of a predetermined number of pixels. For each unit block, information embedded in the transform coefficients of MRR that represents the same spatial region as the unit block is read. The read information is compared, for verification, with the authentication data assumed to have been embedded when embedding the information. In this way, the tampered position on the digital image can be localized on a regional basis of unit block. Further, when embedding the tamper-detection-information, the information is embedded in the transform coefficients of relatively low frequency components. Accordingly, if the image is subjected to an irreversible image processing, variation in the embedded key data and authentication data is small comparing to that caused by the intentional image tampering. It is therefore possible to distinguish between the changes caused by the irreversible image processing and the intentional image tampering.

Herein, as a preferable method of extracting the authentication data, a set value T is predetermined and q is predetermined as a value obtained by dividing a transform coefficient by a predetermined quantization step size and then rounding off the result, and the step of extracting embedded information includes:

a step of comparing an absolute value of the transform coefficient with the set value T;

a step of determining whether a value of the transform coefficient is positive or negative if the absolute value is less than the set value T, and extracting a bit value of embedded information embedded in the transform coefficient based on the determination;

a step of determining whether the value q is even or odd if the absolute value is not less than the set value T, and extracting a bit value of embedded information embedded in the transform coefficient based on the determination.

In this manner, information can be extracted with high accuracy and with less deterioration in image quality.

Furthermore, the tamper-detection-information embedding/tamper detecting method described in the above third and fourth aspects is typically realized by a computer device structured by a storage device (ROM, RAM, hard disk, etc.) storing predetermined program data capable of carrying out each of the above described steps and a CPU executing the program data. The program data may also be supplied to the computer device via a storage medium (CD-ROM, floppy disk, etc.).

These and other objects, features, aspects and advantages of the present invention will become more apparent from the following detailed description of the present invention when taken in conjunction with the accompanying drawings.

BRIEF DESCRIPTION OF THE DRAWINGS

FIG. 12 is a diagram schematically showing transform coefficients of LH3 and LH2 signals representing the same spatial region as a block of 32 by 32 pixel size.

FIG. 13 is a diagram exemplarily explaining a computation under XOR.

DESCRIPTION OF THE PREFERRED EMBODIMENTS

Figure 1:
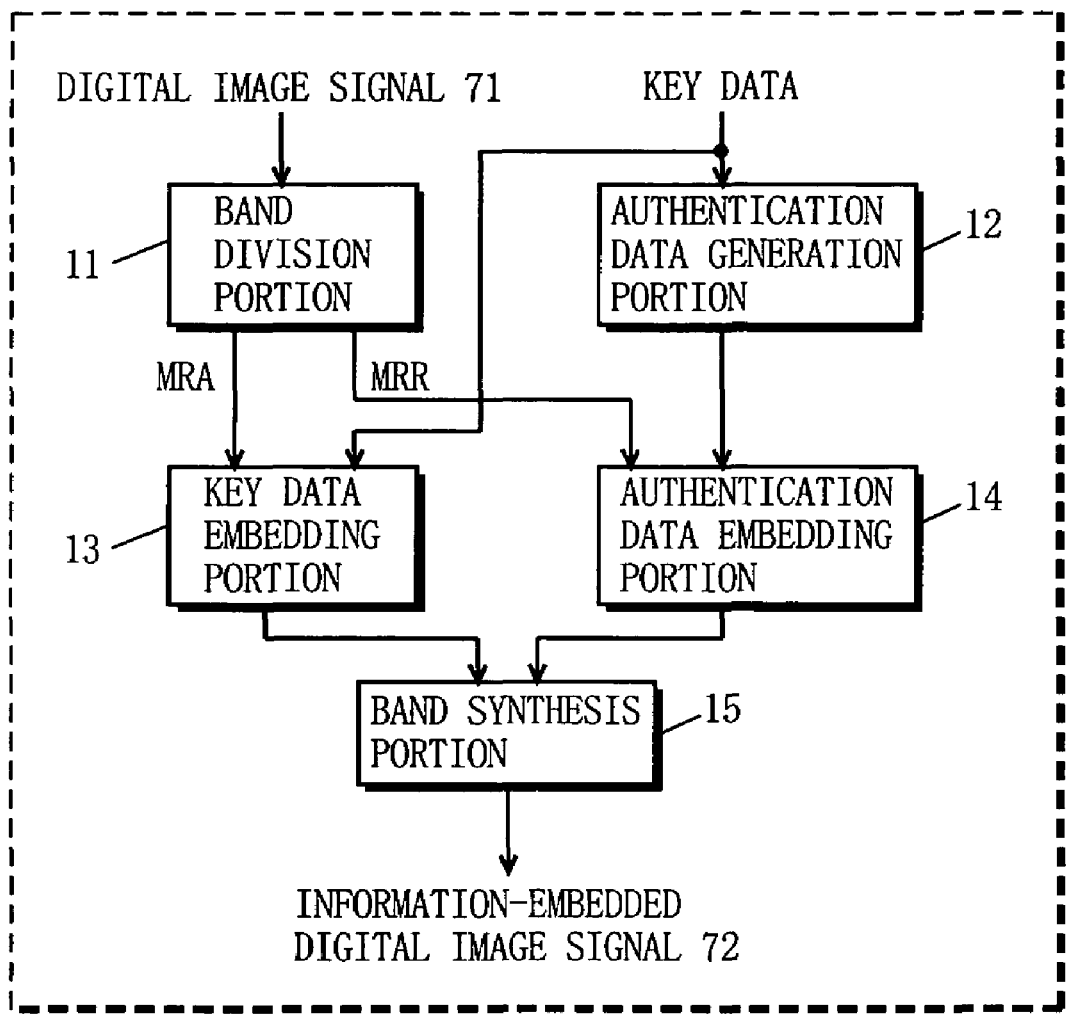
FIG. 1 is a block diagram showing the structure of a tamper-detection-information embedding apparatus 1 according to one embodiment of the present invention.
Figure 2:
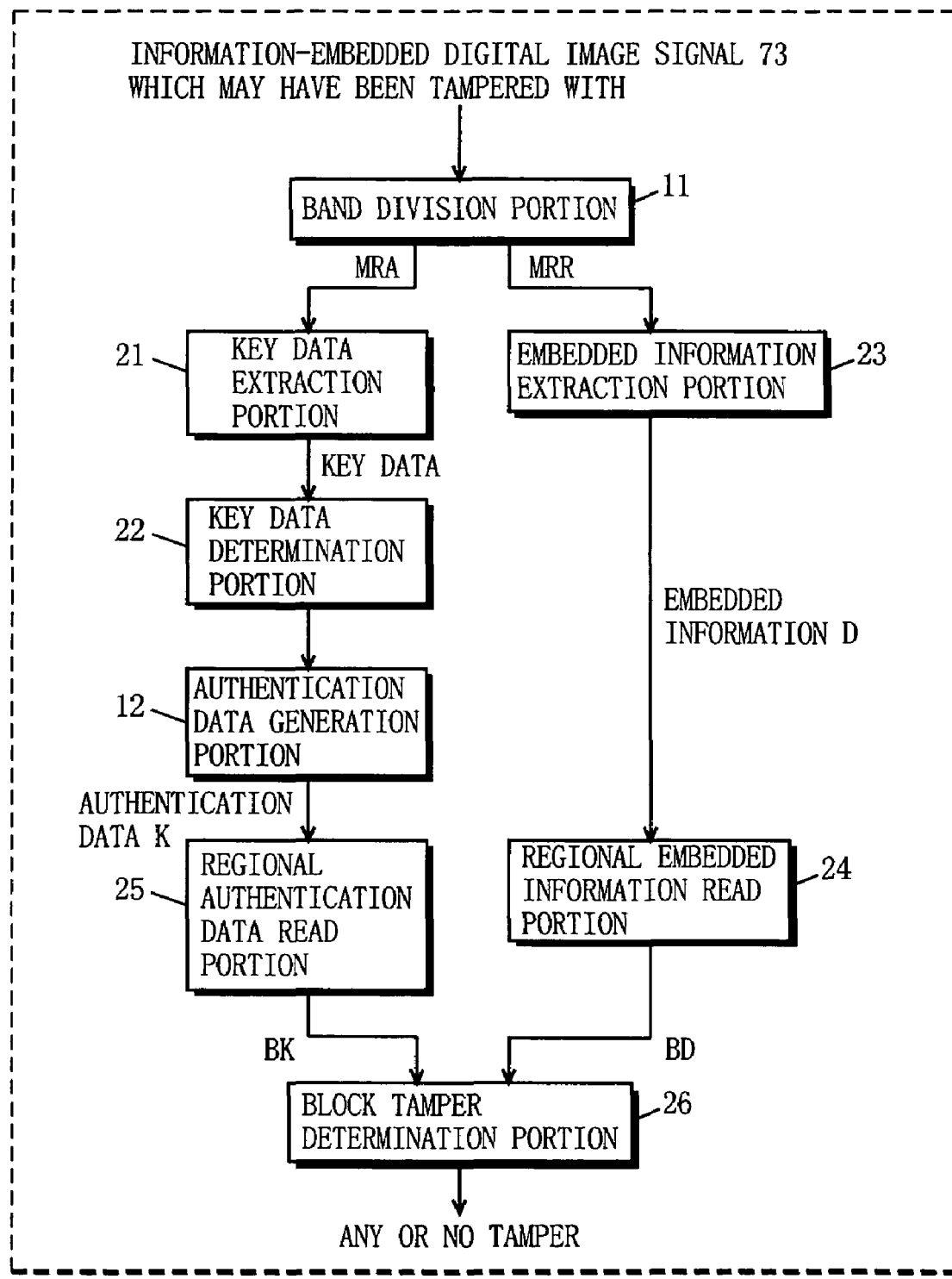
FIG. 2 is a block diagram showing the structure of a tamper detecting apparatus 2 according to the embodiment of the present invention.

FIG. 1 is a block diagram showing the structure of an apparatus 1 for embedding information for tamper detection (hereinafter, referred to as tamper-detection-information embedding apparatus 1) according to one embodiment of the present invention. FIG. 2 is a block diagram showing the structure of a tamper detecting apparatus 2 according to the embodiment of the present invention.

In FIG. 1, the tamper-detection-in-formation embedding apparatus 1 includes a band division portion 11, an authentication data generation portion 12, a key data embedding portion 13, an authentication data embedding portion 14, and a band synthesis portion 15. In FIG. 2, the tamper detecting apparatus 2 includes the band division portion 11, a key data extraction portion 21, a key data determination portion 22, the authentication data generation portion 12, an embedded information extraction portion 23, a regional embedded information read portion 24, a regional authentication data read portion 25, and a block-tamper determination portion 26.

The band division portion 11 and the authentication data generation portion 12 of the tamper detecting apparatus 2 are structurally the same as those of the tamper-detection-information embedding apparatus 1, and therefore, are provided with the same reference numerals and description thereof is omitted.

Hereinafter, by further referring to FIGS. 3 to 13, described is the procedural flow of a method for detecting tamper with a digital image which is carried out by the tamper-detection-information embedding apparatus 1 and the tamper detecting apparatus 2 according to the embodiment.

First, by referring to FIGS. 1 and 3 to 9, a method of embedding information which is carried out by the tamper-detection-information embedding apparatus 1 is described.

Figure 3:
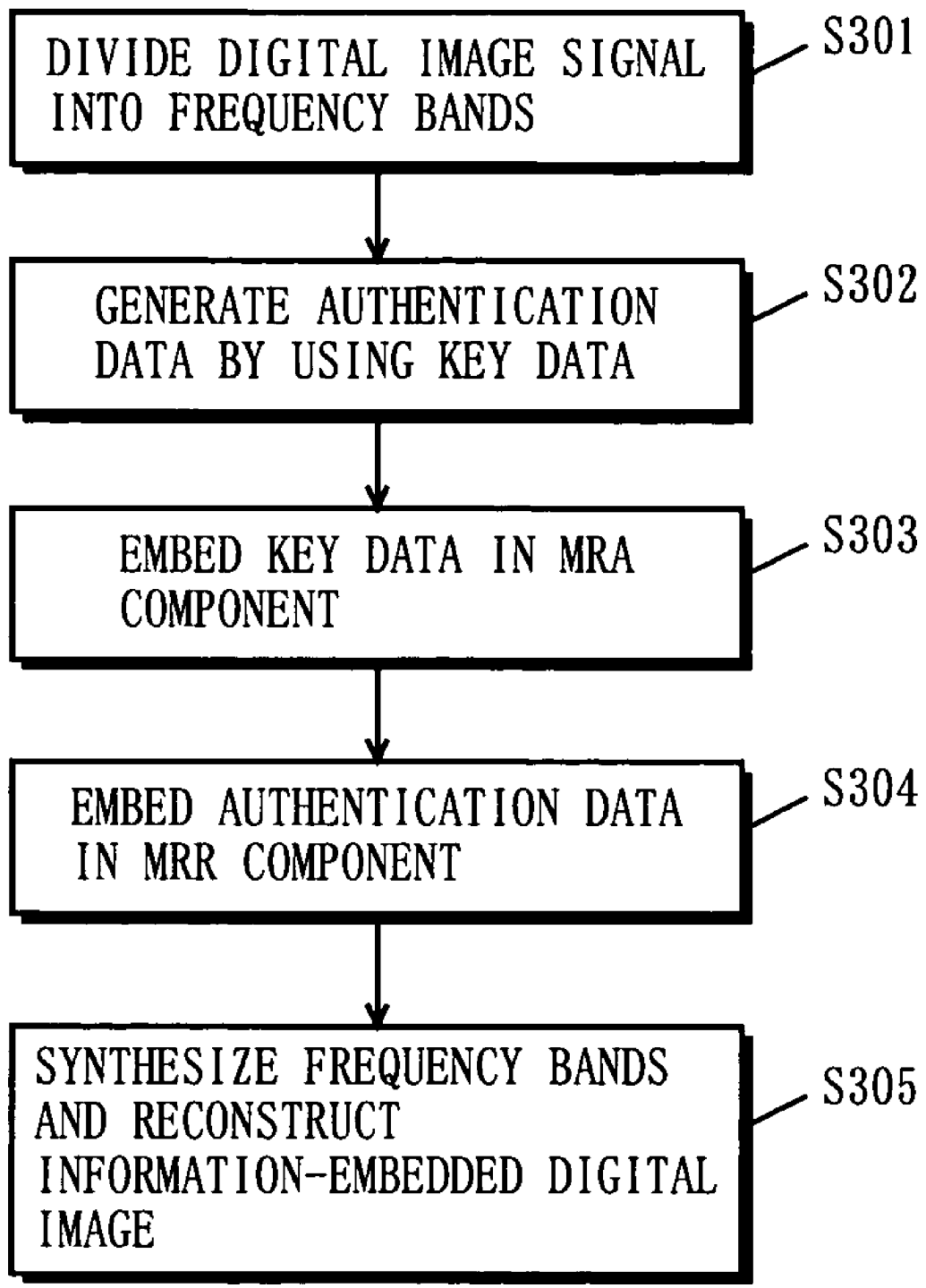
FIG. 3 is a flowchart showing the processing carried out by the tamper-detection-information embedding apparatus 1 in FIG. 1.

FIG. 3 is a flowchart showing processing carried out by the tamper-detection-information embedding apparatus 1 of the embodiment.

Figure 4:
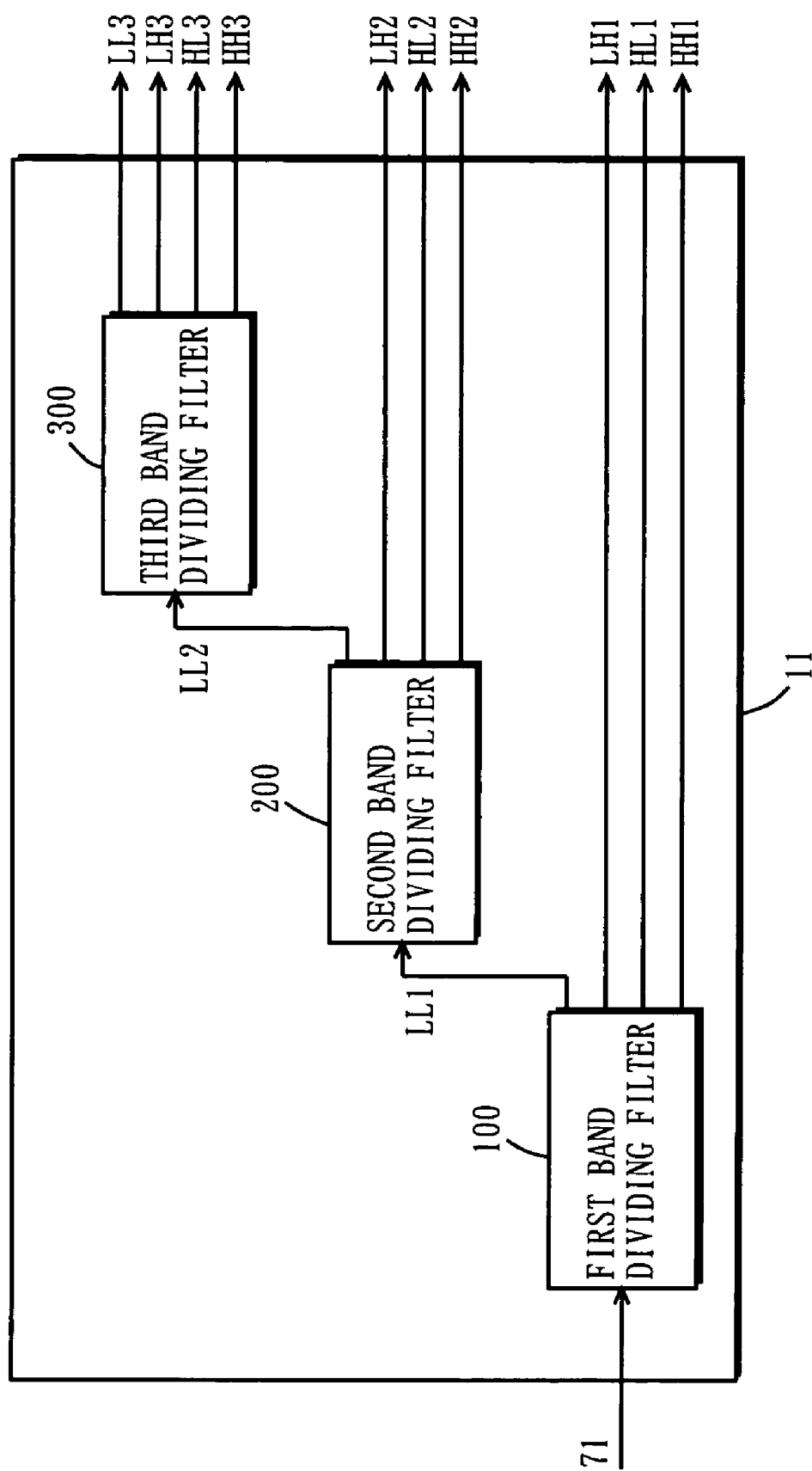
FIG. 4 is a block diagram exemplarily showing the structure of a band division portion 11 in FIG. 1.
Figure 5:
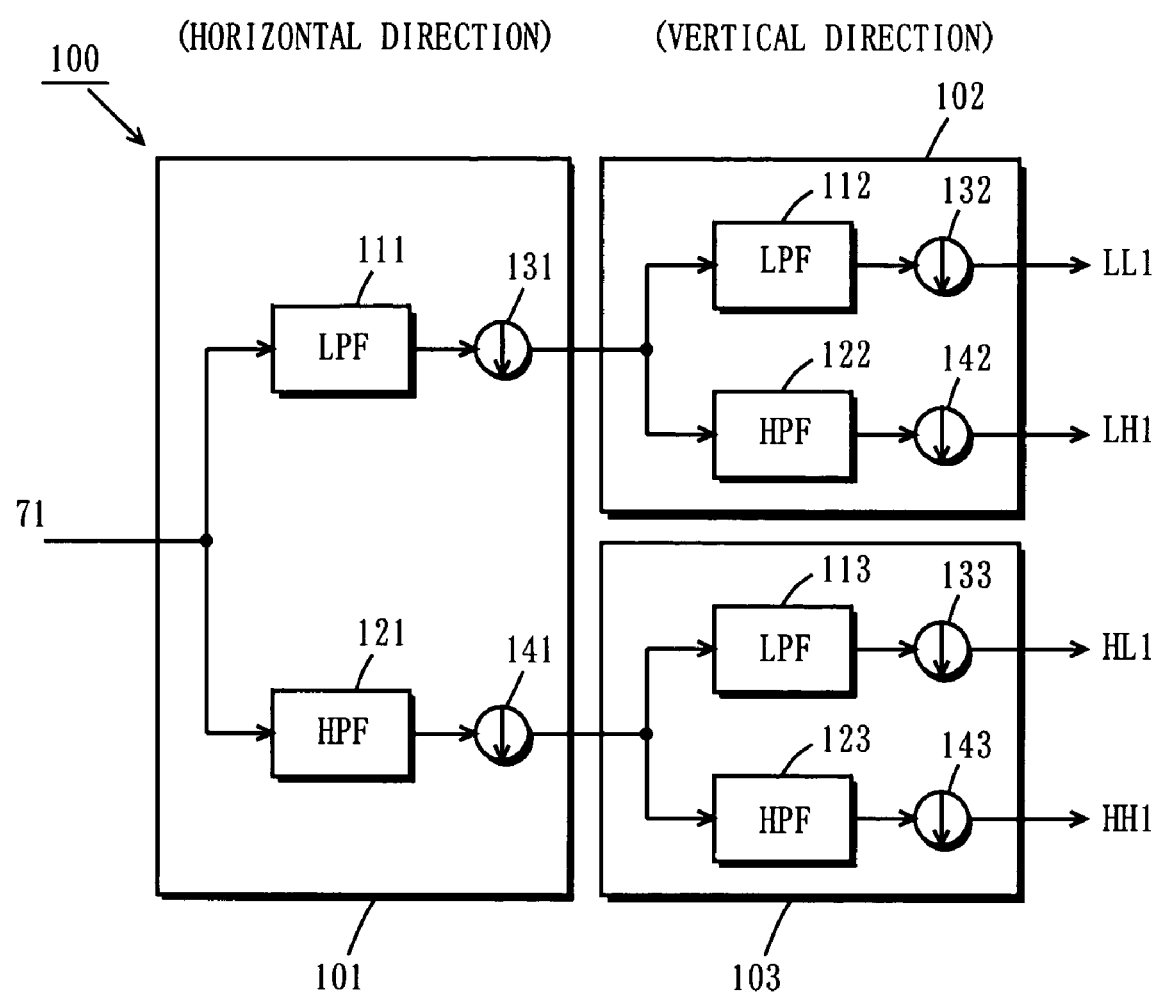
FIG. 5 is a block diagram exemplarily showing the detailed structure of a first band dividing filter 100 in FIG. 4.
Figure 6:
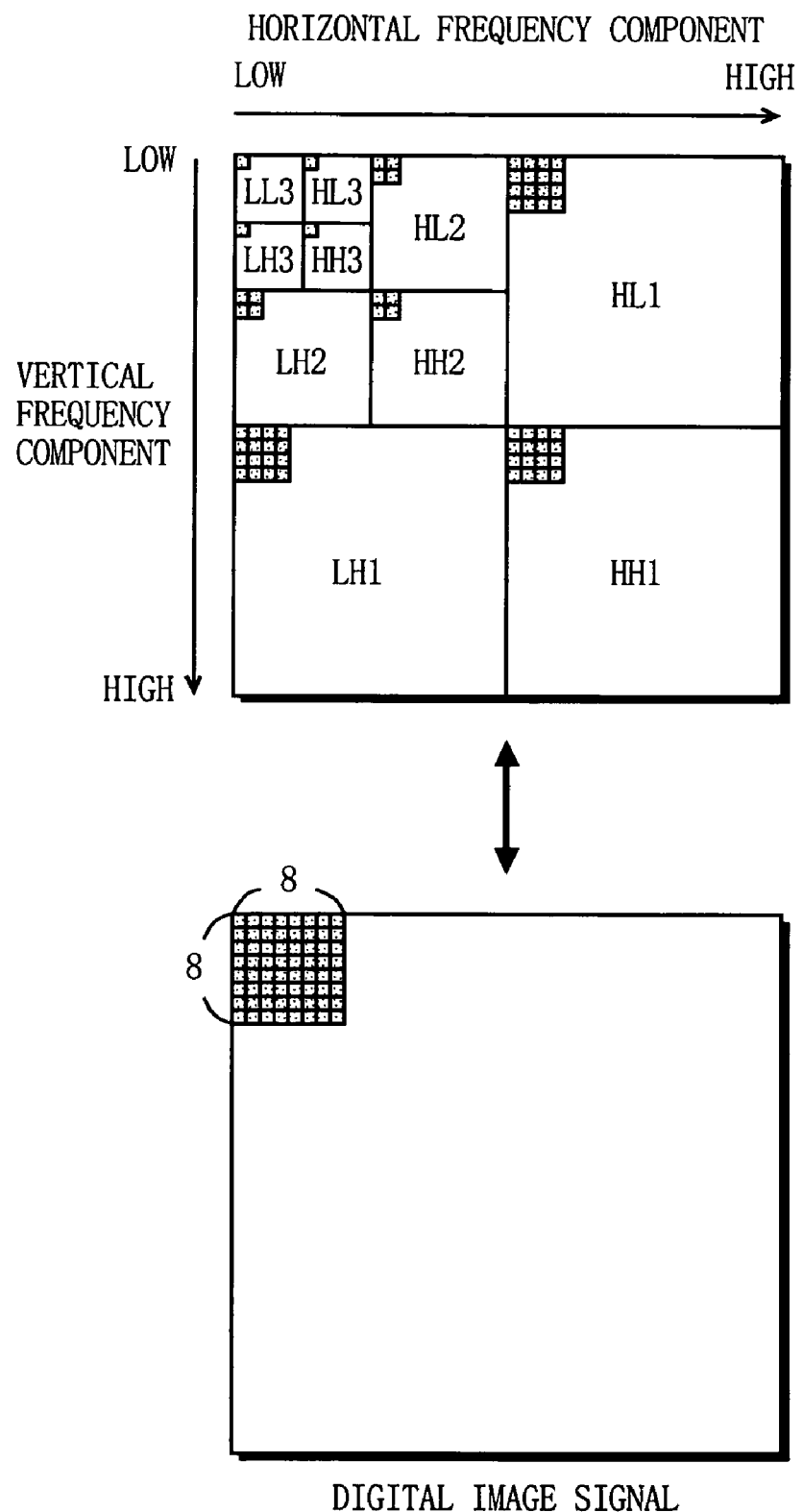
FIG. 6 is a diagram illustrating, in a two-dimensional frequency region, signals subjected to discrete wavelet transform.

Described by referring to FIGS. 4 to 6 is processing carried out by the band division portion 11 that subjects a digital image signal to conventional discrete wavelet transform to divide a band of the signal into three hierarchies. FIG. 4 is a block diagram exemplarily showing the detailed structure of the band division portion 11 in FIG. 1. In FIG. 4, the band division portion 11 is provided with first to third band dividing filters 100, 200, and 300, all of which are identical in structure.

Each of the first to third band dividing filters 100 to 300 divides an incoming image signal into four frequency bands and obtains wavelet coefficients (hereinafter, referred to as transform coefficients) for every frequency band (step S301). Here, the transform coefficients may be equivalently obtained by sub-band division. The first band dividing filter 100 of the band division portion 11 receives a digital image signal 71.

The first band dividing filter 100 divides the digital image signal 71 into four signals varied in bands, i.e., a signal LL1, signal LH1, signal HL1, and signal HH1 (hereinafter, collectively referred to as first hierarchical signal), on the basis of parameters of horizontal and vertical frequency components. The second band dividing filter 200 receives only the signal LL1 which has the lowest band in the first hierarchical signal, and then again divides the signal into four signals varied in bands, i.e., a signal LL2, signal LH2, signal HL2, and signal HH2 (hereinafter, collectively referred to as second hierarchical signal). Then, the third band dividing filter 300 receives only the signal LL2 which has the lowest band in the second hierarchical signal, and again divides the signal into four signals varied in bands, i.e., a signal LL3, signal LH3, signal HL, and signal HH3 (hereinafter, collectively referred to as third hierarchical signal).

FIG. 5 is a block diagram exemplarily showing the structure of the first band dividing filter 100 in FIG. 4. In FIG. 5, the first band dividing filter 100 is provided with first to third two-band division portions 101 to 103. These first to third two-band division portions 101 to 103 are provided with one-dimensional low-pass filters (LPF) 111 to 113, one-dimensional high-pass filters (HPF) 121 to 123, and down-samplers 131 to 133 for LPFs and down-samplers 141 to 143 for HPFs for decimating the signal at a ratio of 2:1, respectively.

The first two-band division portion 101 receives the digital image signal 71, filters any horizontal component thereof through both the LPF 111 and HPF 121, and then generates two signals. Thereafter, the first two-band division portion 101 decimates the filtered signals at a ratio of 2:1, respectively, by using the down-samplers 131 and 141, and then outputs the signals to the next stage. The second two-band division portion 102 receives the signal from the down-sampler 131, and then filters any vertical component thereof through both the LPF 112 and HPF 122. Then, the second two-band division portion 102 decimates the filtered signals at a ratio of 2:1, respectively, by using the down-samplers 132 and 142, and then outputs two signals as signals LL1 and LH1. The third two-band division portion 103 receives the signal from the down-sampler 141, and then filters any vertical component thereof through both the LPF 113 and HPF 123. Then, the third two-band division portion 103 decimates the signals at a ratio of 2:1, respectively, by using the down-samplers 133 and 143, and then outputs two signals as signals HL1 and HH1.

In this way, the first band dividing filter 100 outputs four signals, i.e., the signal LL1 low in both horizontal and vertical components, the signal LH1 low in horizontal but high in vertical, the signal HL1 high in horizontal but low in vertical, and the signal HH1 high in both. Here, from the four signals outputted, transform coefficients constituting each signal are obtained. The second and third band dividing filters 200 and 300 each carry out processing similar to the above for the incoming signals.

As a result of the band dividing processing carried out by the above described first to third band dividing filters 100 to 300, the digital image signal 71 is divided into 10 signals varied in bands, that is, the signals LL3, LH3, HL3, HH3, LH2, HL2, HH2, LH1, HL1, and HH1. FIG. 6 is a diagram illustrating these ten signals in a two-dimensional frequency region. Herein, the signal LL3 lowest in the frequency band is referred to as MRA (Multi-Resolution Approximation), and the other signals LH3, HL3, HH3, LH2, HL2, HH2, LH1, HL1, and HH1, are referred to as MRR (Multi-Resolution Representation).

In FIG. 6, the vertical axis represents a vertical frequency component, which becomes higher as is directed downward, and the horizontal axis represents a horizontal frequency component, which becomes higher as is directed rightward.

Each divided area in FIG. 6 is representing data in one frame of image, and a ratio between area sizes is equivalent to that between the number of data in the band signals. In detail, in a case where the number of data in the signals LL3, LH3, HL3, and HH3 as the third hierarchical signal is "1", the number of data in the signals LH2, HL2, and HH2 as the second hierarchical signal is "4 (2 by 2 in size)", and the number of data in the signals LH1, HL1, and HH1 as the first hierarchical signal is "16 (4 by 4 in size)".

For example, if one piece of data shown at the top-left of the LL3 signal area is for a certain number of pixels on the original image, the same number of pixels is represented by one piece of data shown at the top-left of each of the LH3, HL3, and HH3 signal areas. Similarly, the same number of pixels is represented by four pieces of data shown at the top-left of each of the LH2, HL2, and HH2 signal areas, and by sixteen pieces of data in the LH1, HL2, and HH1 signal areas, respectively (square portion filled in black in each signal area in FIG. 6). Therefore, in the drawing, 64 pieces of pixel data (8 by 8 in size) on the digital image signal (shown at the top-left) represents the same spatial region as that represented by the transform coefficients which are shown as black squares in all frequency bands.

Next, the authentication data generation portion 12 generates a pseudo-random number series by using a predetermined key data, and then generates authentication data from the pseudo-random number series (step S302). To be specific, the authentication data generation portion 12 determines whether the each of the real numbers in the generated pseudo-random number series is positive or negative, and if positive, regards a bit value as "1", and if negative, regards a bit value as "0" to generate the authentication data. For example, authentication data AD is generated from a pseudo-random number series PN in the following manner.

PN={0.12, −0.23, −1.21, 0.23, 1.1, −0.34, 0.01, −0.51, . . . , −0.33}

AD={1, 0, 0, 1, 1, 0, 1, 0, . . . , 0}

The key data exemplarily includes information such as an initial value, a type of function for generation of a pseudo-random number series, and a bit length thereof. For simplification, in the present embodiment, assume that the key data is a value represented by the data length of 8-bit. Further, in the following explanation, it is assumed that the authentication data is a bit stream composed of binary bit values of "1" and "0".

The key data is essential information for data embedment, and is also used for data extraction in the tamper detecting apparatus 2. It is therefore requested to determine, in advance, the key data between the tamper-detection-information embedding apparatus 1 and the tamper detecting apparatus 2.

Next, the key data embedding portion 13 reads the transform coefficients of MRA in the image signal divided by the band division portion 11 in a predetermined order, and then embeds the key data in the transform coefficients with a predetermined method (step S303). Among various methods available for this embedment, the method disclosed in Japanese Patent Laid-Open Publication No. 11-196262 (1999/196262), which was proposed (applied) by the inventors of the present invention, achieves embedment with high accuracy and with less distortion in image quality. In the method, q is assumed to be a value obtained by dividing a transform coefficient by quantization step size Q, and is set to a nearest even or odd integer depending on a bit value of key data corresponding to the transform coefficient, thereby enabling the embedding of the key data.

Note that the predetermined order for reading the transform coefficients of MRA is essential information for data embedment, and is also used for key data extraction in the tamper detecting apparatus 2. Here, the key data may be converted to digital information being encrypted for embedment. Alternatively, it is possible to add an error correction code to the key data before embedment. Further, if the number of bits of embedding digital information is smaller than the number of transform coefficients of MRA, every bit of the digital information is once embedded, and then the same bits are embedded again starting from the first bit.

Figure 7:
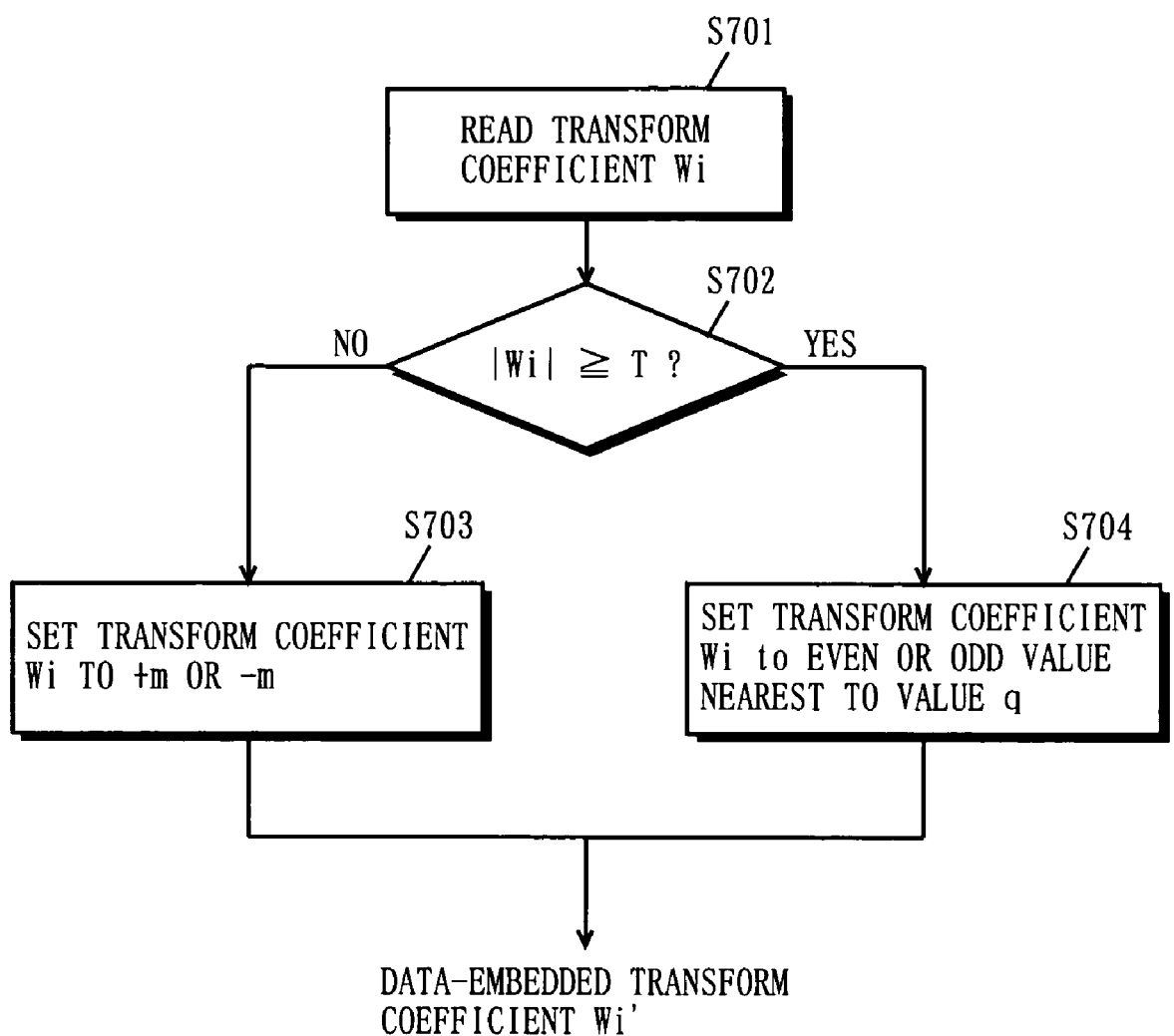
FIG. 7 is a flowchart showing the processing carried out by an authentication data embedding portion 14 in FIG. 1.

Next, processing carried out by the authentication data embedding portion 14 in FIG. 1 (step S304) is described by referring to FIG. 7, which is a flowchart exemplarily showing the processing.

The authentication data embedding portion 14 reads transform coefficients Wi of the signal LH3 in FIG. 4 in a predetermined order from MRR of the image signal divided in the band division portion 11 (step S701). The authentication data embedding portion 14 then determines whether or not an absolute value |Wi| of the read transform coefficient is not less than a predetermined set value T (step S702).

If the absolute value |Wi| is less than the set value T in step S702, the authentication data embedding portion 14 sets the transform coefficient Wi to a predetermined value +m or −m depending on a bit value of authentication data corresponding to the transform coefficient(step S703). Herein, the value m can be set at will as long as it is not more than the set value T. The smaller the value m is, the better the deterioration in image quality becomes, but the less the protection against an external attack becomes. The larger the value m is, the better the protection against an external attack becomes, but the worse the deterioration in the image quality becomes due to the increase in amount of variation of transform coefficient. The value m thus may be appropriately set depending on the use of the apparatus and the level of the digital signal treated thereby. On the other hand, if the absolute value |wi| is not less than the set value T in step S702, the authentication data embedding portion 14 sets, similarly to the key data embedding portion 13, q to a nearest even or odd integer depending on the bit value of authentication data corresponding to the transform coefficient (step S704). Here, q is assumed to be a value obtained by dividing a transform coefficient by quantization step size Q.

In this way, bit values of the authentication data are embedded in the transform coefficients Wi, and thereby data-embedded transform coefficients Wi' are generated.

After completing the above processing for the signal LH3, the authentication data embedding portion 14 reads the transform coefficients Wi of the signal LH2 in a predetermined order, and then repeats the processing in steps S701 to S704.

Note that, although the processing is carried out first for the transform coefficients of the signal LH3 and then for the signal LH2 in this example, the order may be inverted. Further, the authentication data is not necessarily embedded in all transform coefficients Wi of the signals LH3 and LH2, but may be embedded alternately in vertical and horizontal directions (refer explanation for the tamper detecting apparatus 2, which will be described later). In this manner, the deterioration in image quality caused by information embedment can be reduced.

The order in which the signals LH2 and LH3 are treated and the predetermined order for reading the transform coefficients thereof are essential information for data embedment, and are also used for data extraction in the tamper detecting apparatus 2. Further, the set value T used for comparison may be set differently for the transform coefficients of the signal LH2 and the signal LH3. The set value T for the signal LH3 is preferably set smaller than that for the signal LH2. For example, the set value T is predetermined as "7" for the signal LH3 signal and as "10" for the LH2 signal, and the value m is predetermined as "2".

Figure 8:
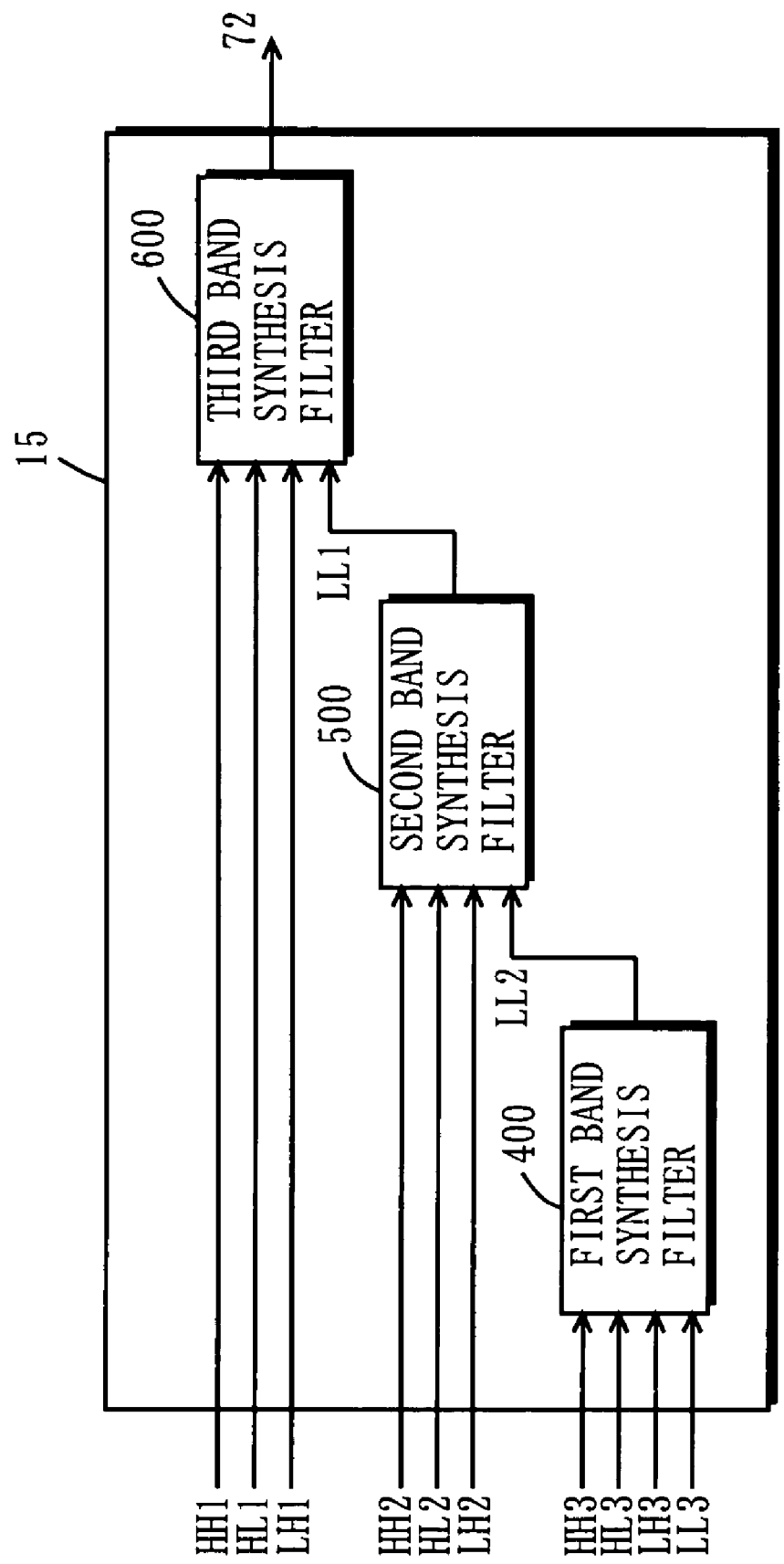
FIG. 8 is a block diagram exemplarily showing the structure of a band synthesis portion 15 in FIG. 1.
Figure 9:
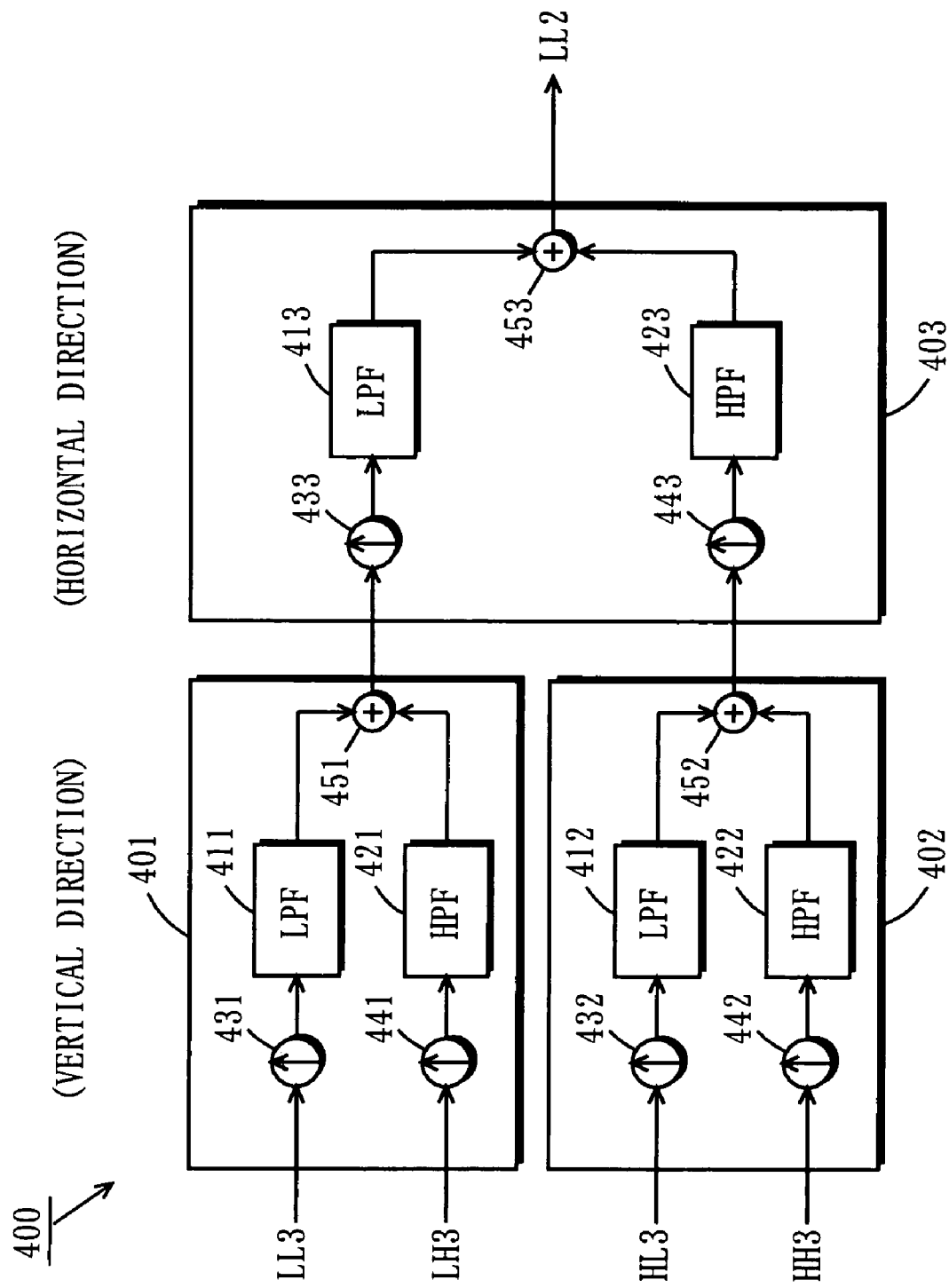
FIG. 9 is a diagram exemplarily showing the structure of a first band synthesis filter 400 in FIG. 8.

Next, by referring to FIGS. 8 and 9, processing carried out by the band synthesis portion 15 is described.

FIG. 8 is a block diagram exemplarily showing the structure of the band synthesis portion 15 in FIG. 1. In FIG. 8, the band synthesis portion 15 is provided with first to third band synthesis filters 400, 500, and 600, all of which are identical in structure.

These first to third band synthesis filters 400, 500, and 600 each receive the four signals varied in frequency bands, and then synthesizes the signals to output as one signal (step S305). The first band synthesis filter 400 receives the signals LL3, LH3, HL3, and HH3, and then synthesizes these signals to generate the signal LL2. The second band synthesis filter 500 receives the signals LL2, LH2, HL2, and HH2, and then synthesizes these signals to generate the signal LL1. Thereafter, the third band synthesis filter 600 receives the signals LL1, LH1, HL1, and HH1, and then synthesizes these signals to reconstruct a digital image signal 72.

FIG. 9 is a block diagram exemplarily showing the structure of the first band synthesis filter 400 in FIG. 8. In FIG. 9, the first band synthesis filter 400 is provided with first to third two-band synthesis portions 401 to 403. These first to third two-band synthesis portions 401 to 403 are provided with LPFs 411 to 413, HPFs 421 to 423, and up-samplers 431 to 433 for LPFs and up-samplers 441 to 443 for HPFs for inserting zero to the signal at a ratio of 2:1, and adders 451 to 453, respectively.

The first two-band synthesis portion 401 receives the signals LL3 and LH3, and then converts the signals into signals twice in magnitude by using the up-samplers 431 and 441, respectively. Then, the vertical component of the converted two signals is filtered through the LPF 411 and HPF 421, respectively, and then the filtered two signals are added for output. The second band synthesis portion 402 receives the signals HL3 and HH3, and then converts the signals into signals twice in magnitude by using the up-samplers 432 and 442, respectively. Thereafter, the vertical component of the converted two signals is filtered through the LPF 412 and HPF 422, respectively, and then the filtered two signals are added together for output. The third two-band synthesis portion 403 receives outputs from the adders 451 and 452, and then respectively converts the outputs into signals twice in magnitude by using the up-samplers 433 and 443. Then, horizontal component of the converted two signals is filtered through the LPH 413 and HPF 423, respectively and then the filtered two signals are added together for output.

Accordingly, the first band synthesis filter 400 outputs the signal LL2 low in both horizontal and vertical components, that is, the second hierarchical signal. The second and third band synthesis filters 500 and 600 each carry out processing similar to the above for the incoming signals. In this way, the band synthesis portion 15 reconstructs 10 frequency band signals LL3, LH3, HL3, HH3, LH2, HL2, HH2, LH1, HL1, and HH1 to the digital image signal 72 to which embedment has been done.

Next, by referring to FIGS. 2 and 10 to 13, described is a method of tamper detection which is carried out by the tamper detecting apparatus 2 according to the embodiment.

Figure 10:
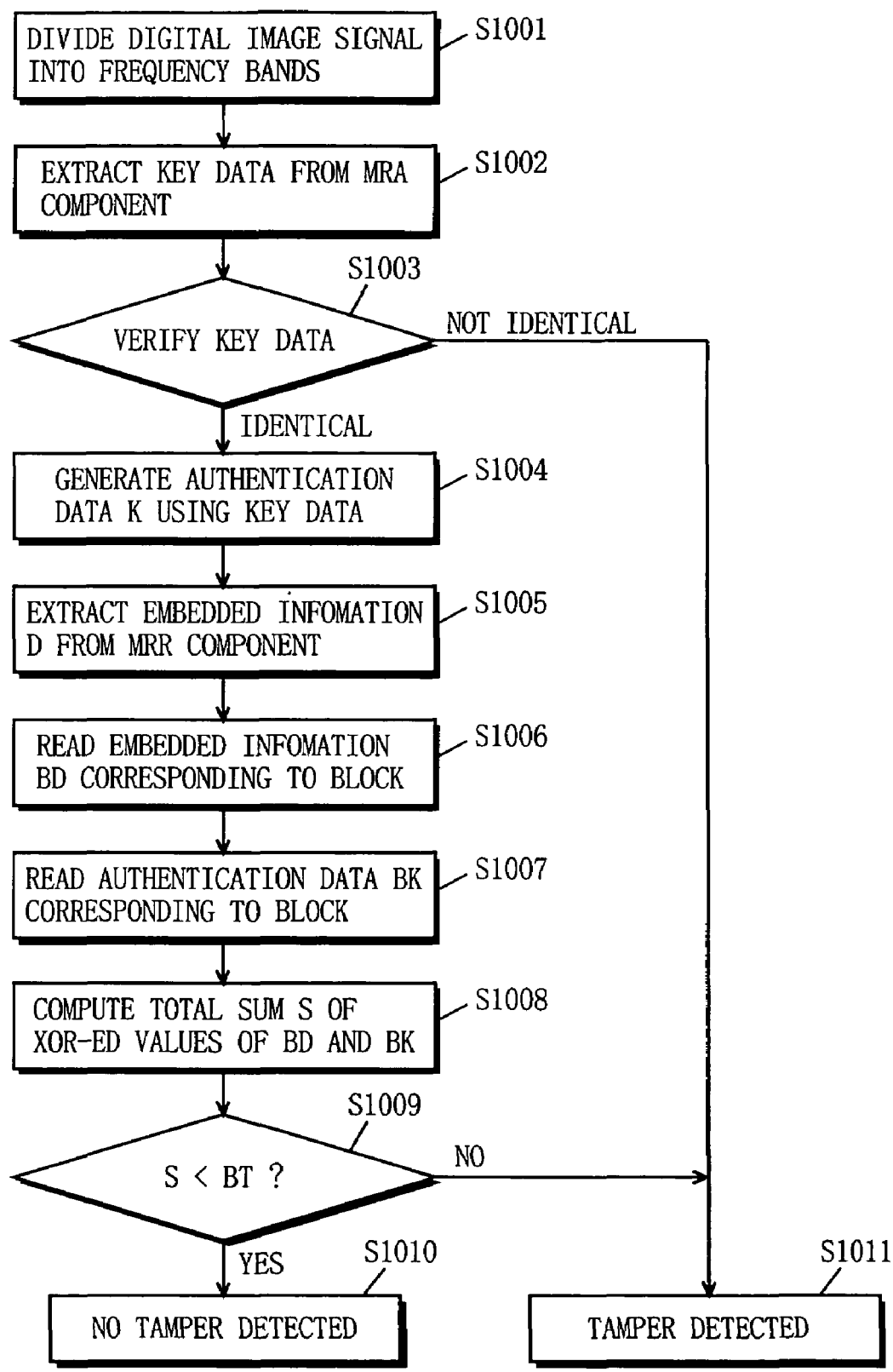
FIG. 10 is a flowchart showing the processing carried out by the tamper detecting apparatus 2 in FIG. 2.

FIG. 10 is a flowchart showing processing carried out by the tamper detecting apparatus 2 of the embodiment.

In FIG. 2, the band division portion 11 receives a digital image signal 73. The digital image signal 72 outputted from the band synthesis portion 15 of the tamper-detectioninformation embedding apparatus 1 becomes the digital image signal 73 due to compression/decompression or tampering during its transmission. The band division portion 11 subjects the received digital image signal 73 to discrete wavelet transform to divide the same into 10 signals varied in frequency bands, i.e., signals LL3, LH3, HL3, HH3, LH2, HL2, HH2, LH1, HL1, and HH1, and obtains transform coefficients for every signal (step S1001).

Next, the key data extraction portion 21 reads the transform coefficients of MRA in the image signal 73 divided by the band division portion 11 in the same order in which the transform coefficients are read by the key data embedding portion 13 of the tamper-detection-information embedding apparatus 1, and then extracts the key data embedded in the signal (step S1002). Among various method available for this extraction, the method disclosed in the above described publication applied by the inventors of the present invention achieves extraction with high accuracy and with less distortion in image quality. In the method, q is assumed to be a value obtained by dividing a transform coefficient by quantization step size Q and then rounding off the result. A bit value of the embedded key data is extracted based on the determination whether q is an odd or even number.

The key data determination portion 22 determines, for verification, whether or not the key data extracted by the key data extraction portion 21 is identical to the key data used by the tamper-detection-information embedding apparatus 1 (step S1003). The determination is carried out by comparing the key data extracted in the key data extraction portion 21 with the key data previously held therein as that used in the tamper-detection-information embedding apparatus 1. Herein, if a plurality of key data is used by the tamper-detection-information embedding apparatus 1, the key data determination portion 22 correspondingly holds the same data for comparison.

In step S1003, if the extracted key data is determined as identical to the key data previously held, the key data determination portion 22 carries out processing from step S1004 and onwards. On the other hand, if the extracted key data is determined as not identical, the key data determination portion 22 determines that the digital image signal 73 has been tampered with (step S1011).

The key data determination portion 22 is not an indispensable component to the tamper detecting apparatus 2. In the present invention, however, such determination for verifying the key data improves reliability of the tamper detecting apparatus 2 in detection of a tampering with the digital image. The key data determination portion 22 is therefore preferably used in view of making the tamper detecting apparatus 2 more preferable in practical use.

The authentication data generation portion 12 generates, in the above described manner, a pseudo-random number series by using the key data previously held therein as the key data used by the tamper-detection-information embedding apparatus 1. The key data includes information such as an initial value, a type of function for generation of the pseudo-random number series, and a bit length thereof. The authentication data generation portion 12 then generates authentication data K from the pseudo-random number series (step S1004).

Figure 11:
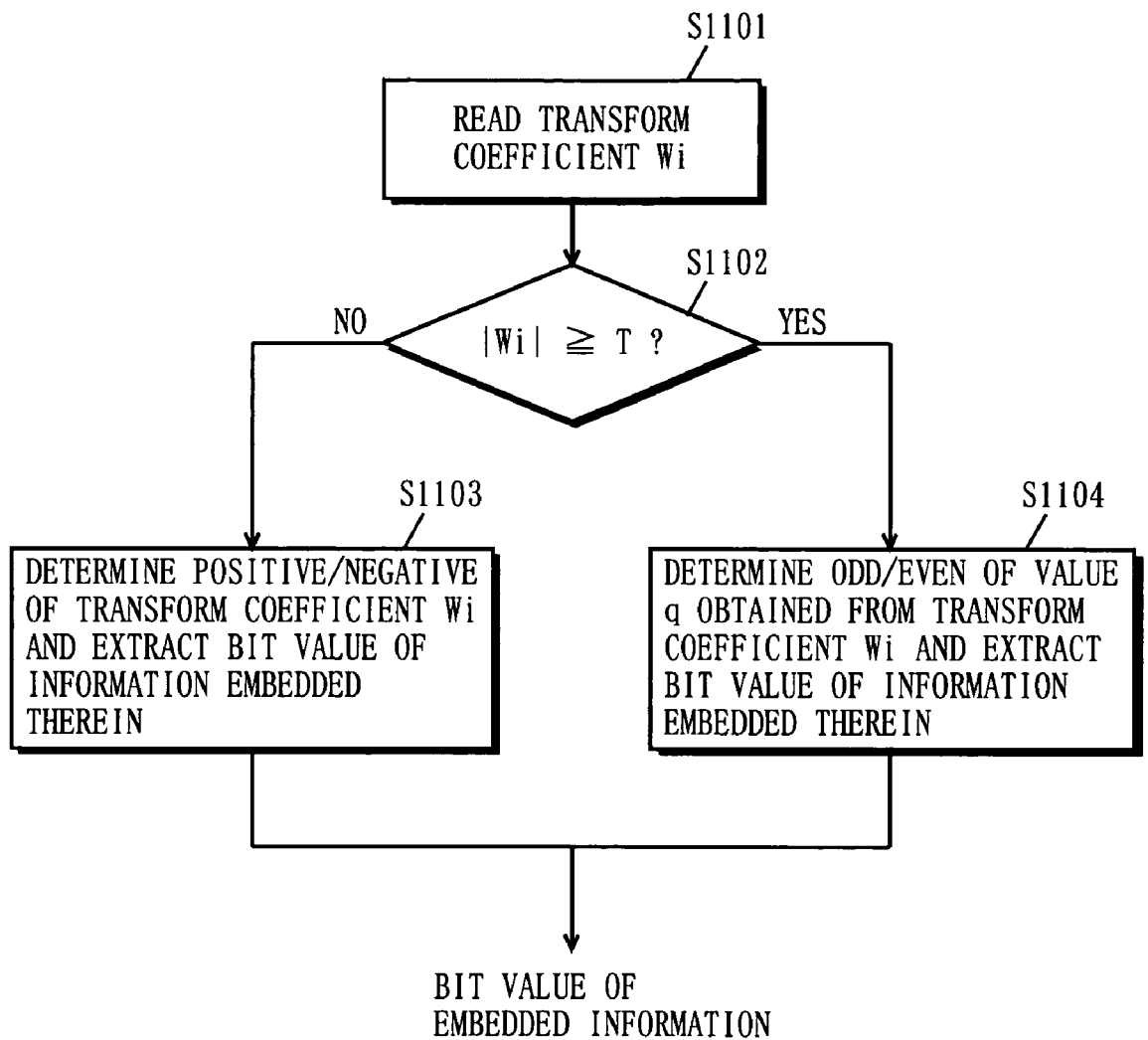
FIG. 11 is a flowchart exemplarily showing the processing carried out by an embedded information extraction portion 23 in FIG. 2.
Figure 14:
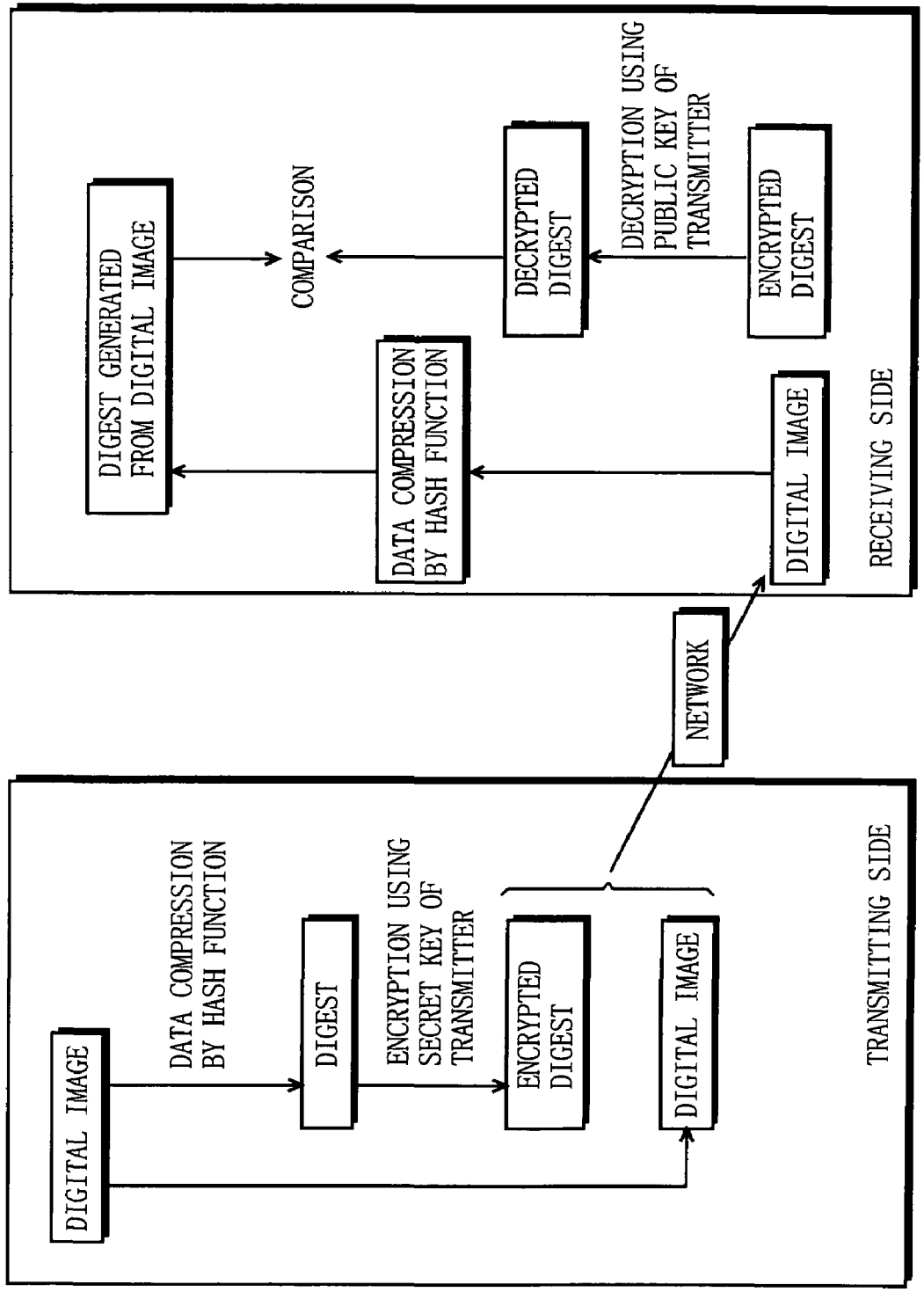
FIG. 14 is a diagram explaining an outline procedure of a conventional electronic authentication.

Next, processing carried out by the embedded information extraction portion 23 in FIG. 2 (step S1005) is described by referring to FIG. 11, which is a flowchart exemplarily showing the processing.

The embedded information extraction portion 23 reads the transform coefficients Wi of the signals LH3 and LH2 from MRR of the digital image signal 73 divided in the band division portion 11. Here, the transform coefficients Wi are read in the same order in which those are read by the authentication data embedding portion 14 of the tamper-detection-information embedding apparatus 1. To be specific, the transform coefficients Wi are read in the order of signal LH3 and then the signal LH2, and also in the predetermined order within each signal (step S1101). The embedded information extraction portion 23 then determines whether or not the absolute value |Wi| of the read transform coefficient is not less than the predetermined set value T (step S1102).

If the absolute value |Wi| is less than the set value T in step S1102, the embedded information extraction portion 23 further determines whether the value of the transform coefficient Wi is positive or negative. Based on the determination, the embedded information extraction portion 23 extracts a bit value of the information embedded in each transform coefficient (step S1103). On the other hand, if the absolute value |Wi| is not less than the set value T in step S1102, the embedded information extraction portion 23 extracts a bit value of the information embedded in each coefficient with the similar method carried out by the key data extraction portion 21 (step S1104). In the method, q is assumed to be a value obtained by dividing a transform coefficient by quantization step size Q and then rounding off the result. A bit value of the information embedded in each transform coefficient is extracted based on the determination whether q is an odd number or even number.

By completing the above processing, the embedded information extraction portion 23 extracts embedded information D which is composed of the information embedded in each transform coefficient (step S1005). The embedded information D corresponds to the authentication data assumed to have been embedded in the tamper-detection-information embedding apparatus 1.

Next, by referring to FIG. 12, processing carried out by the regional embedded information read portion 24 and the regional authentication data read portion 25 is described. In FIG. 12, the top-left dotted area shows a block serving as a unit for determining whether or not any tamper exists in the digital image signal 73 (hereinafter, referred to as unit block). Here, the size of the unit block is exemplarily 32 by 32 pixels. Further, in FIG. 12, with respect to the signals LH3 and LH2, transform coefficients representing the same spatial region as the unit block are shown in the frames drawn with the thick line. As is evident from the drawing, if the size of the unit block is 32 by 32 pixels for the digital image signal 73, corresponding block sizes for the signals LH3 and LH2 are 4 by 4 pixels and 8 by 8 pixels, respectively.

Note that the unit block size herein (32 by 32 pixels) is one example, and can be arbitrarily set depending on how small or large a unit (region) for determining the tamper is.

Now, the description is exemplarily made for a case where the transform coefficients of the signals LH3 and LH2 are read alternately in vertical and horizontal directions. In this case, information has been embedded in the same manner by the tamper-detection-information embedding apparatus 1. In this example, embedded information corresponding to the unit block of 32 by 32 pixels is 4 pieces of data in the signal LH3 and 16 pieces of data in the signal LH2 (filled-in-black portions in FIG. 12).

Accordingly, the regional embedded information read portion 24 reads such 20 pieces of information from the embedded information D extracted in the embedded information extraction portion 23 as embedded information BD corresponding to the unit block of 32 by 32 pixels (step S1006).

Similarly, the regional authentication data read portion 25 reads 20 pieces of authentication data corresponding in position to the embedded information BD from the authentication data K generated in the authentication data generation portion 12 as authentication data BK corresponding to the unit block of 32 by 32 pixels (step S1007).

Assume, for example, that the embedded information BD and the authentication data BK respectively read by the regional embedded information read portion 24 and the regional authentication data read portion 25 are BD={1, 0, 1, 1, 1, 0, 0, 1, 1, 0, 0, 1, 1, 1, 0, 1, 0, 1, 0, 1}
BK={1, 1, 1, 0, 1, 0, 0, 1, 1, 0, 0, 0, 1, 0, 0, 1, 0, 1, 0, 1}

Here, in comparison between both, the second, fourth, twelfth, and fourteenth bits differ in value from each other.

Figure 13:
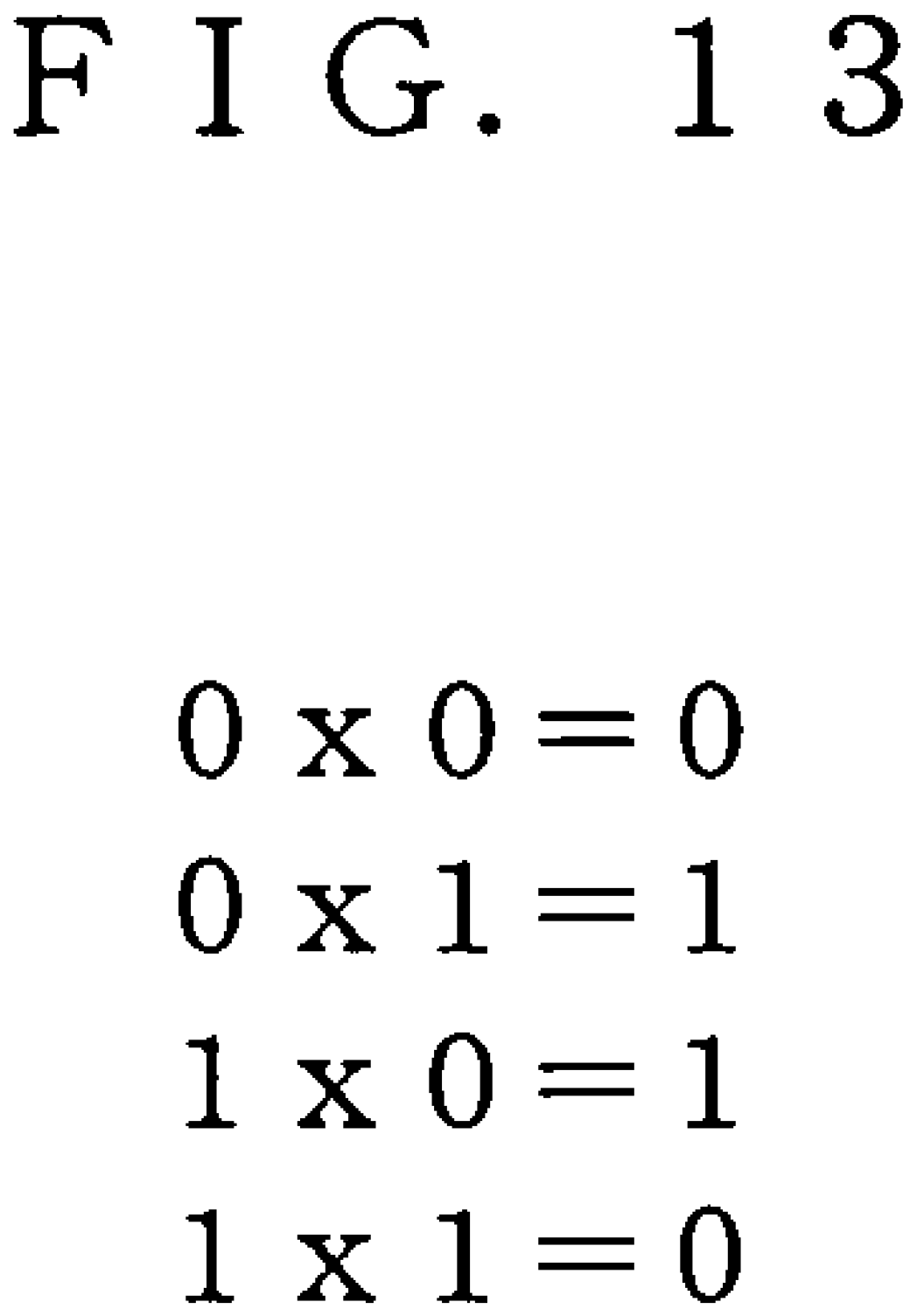

Next, in the block-tamper determination portion 26, the bits at the same positional order in the embedded information BD and the authentication data BK are XORed, and then a sum total S of the XORed values is computed (step S1008). FIG. 13 is a diagram exemplarily showing a computation under the XOR. The result of the computation becomes "1" when both bits differ in value from each other and becomes "0" when both are the same in value. The block-tamper determination part 26 compares the total sum S with a predetermined set value BT so as to determine whether a partial image corresponding to the unit block (in the example, 32 by 32 pixels) has been tampered with or not (step S1009).

For example, the block-tamper determination portion 26 determines that the image has been tampered with if the total sum S is not less than the set value BT, and has not been tampered with if the total sum S is less than the set value BT. The set value BT can be predetermined at will depending on how strictly the tamper determination is made. In such manner, the intentional image tampering and the change caused by the irreversible image processing can be distinguished from each other.

In the above exemplified embedded information BD and the authentication data BK, the bit values differ from each other in the four positions. As a result, the total sum S computed is "4". If the set value BT is predetermined as "3", the total sum S is not less than the set value BT. Accordingly, the unit block is determined to have been tampered with.

The XOR computing carried out in the block-tamper determination portion 26 may take a reverse logic. That is, "0" is computed when both bits differ in value from each other and "1" when both are the same in value. In this case, the block-tamper determination portion 26 determines that the block has been tampered with if the total sum S is less than the set value BT, and not have been tampered with if not less. Instead of the total sum S of the XORed values, the number of or an inner product of bits that coincide with each other between the embedded information BD and the authentication data BK may be computed. Further alternatively, it is possible to substitute "−1" for "0" in the embedded information BD and the authentication data BK, and then compute an inner product thereof.

Based on the determination in step S1009, the tamper detecting apparatus 2 stores in memory (not shown) or outputs to a display (not shown) either information that the unit block (within 32 by 32 pixels) has been tampered with or has not been tampered with (steps S1010, S1011).

The tamper detecting apparatus 2 repeats the processing in steps S1006 to S1009 for all unit blocks to detects the position of the tampered portion on the digital image.

As described above, according to the embodiment of the present invention, in the tamper-detection-information embedding apparatus 1, a digital image signal is hierarchically divided into three bands, and then the authentication data is embedded in the transform coefficients of the signals LH3 and LH2 of MRR. The authentication data is generated from a pseudo-random number series by using the key data, and the key data is embedded in the transform coefficients of MRA. In the tamper detecting apparatus 2, the digital image is divided into unit blocks each composed of a predetermined number of pixels. For each unit block, information embedded in the transform coefficients of MRR that represents the same spatial region as the unit block is read. The read information is compared, for verification, with the authentication data assumed to have been embedded in the tamper-detection-information embedding apparatus 1.

In this way, the tamper detecting apparatus 2 can localize the tampered position on the digital image on a regional basis of unit block. Further, in the tamper-detection-information embedding apparatus 1, the information is embedded in the transform coefficients of relatively low frequency components. Accordingly, even if the irreversible image processing is performed, variation in the embedded key data and authentication data is small comparing to that caused by the intentional image tampering. It is therefore possible to distinguish between the changes caused by the irreversible image processing and the intentional image tampering. Still further, according to a tamper-detection-information embedding method and a tamper detecting method of the present invention, it is not easy for a third party to decipher the authentication data because he/she does not know specifics of frequency bands and transform coefficients in which the information is embedded, the order of reading the transform coefficients, and the key data, thereby preventing overwriting or replacement of the embedded information.

The number of hierarchies obtained by discrete wavelet transform carried out in the band division portion 11 of the embodiment is not limited to three. The signal can be divided into more hierarchies until the signal LL reaches a 1 by 1 element. Further, bands for embedding the authentication data is not limited to the signals LH3 and LH2, but may be other bands among MRR or all bands of MRR. Even in these cases, the order in which the bands are subjected to processing should be predetermined.

Note, however, the authentication data is preferably embedded only in the transform coefficients of the signals in deeper hierarchies in order to make the most of the usable effects of the present invention. Specifically in FIG. 4, it is most preferable to embed the authentication data in some or all of the signals LH3 and HL3 as being the third hierarchical signal and/or the signals LH2 and HL2 as being the second hierarchical signal.

Further, in the above described embodiment, the authentication data embedding portion 14 sequentially embeds the authentication data in each of the transform coefficients read in a predetermined order. For all transform coefficients of MRR that represents the same spatial region as the unit block, however, the same authentication data may be repeatedly embedded.

Still further, if the key data is embedded after encryption using a public key or common key in the tamper-detection-information embedding apparatus 1 of the above described embodiment and the information encrypted and embedded is decrypted in the tamper detecting apparatus 2, the public key or common key to be used should be predetermined between the apparatuses.

The features achieved by the tamper-detection-information embedding apparatus 1 and the tamper detecting apparatus 2 of the above described embodiment are typically realized by a storage device (ROM, RAM, hard disk, etc.) storing predetermined program data and a CPU executing the program data. The program data may also be supplied via a storage medium (CD-ROM, floppy disk, etc.).

While the invention has been described in detail, the foregoing description is in all aspects illustrative and not restrictive. It is understood that numerous other modifications and variations can be devised without departing from the scope of the invention.

What is claimed is:

1. A tamper-detection-information embedding apparatus for embedding predetermined information for tamper detection in a digital image signal, said apparatus comprising:
   a band division portion operable to divide the digital image signal into a plurality of frequency bands;
   an authentication data generation portion operable to generate a pseudo-random number series by using predetermined key data, and to generate authentication data from the pseudo-random number series;
   a key data embedding portion operable to embed the key data in transform coefficients of a lowest frequency band (hereinafter, referred to as MRA) among the plurality of frequency bands;
   an authentication data embedding portion operable to embed the authentication data in transform coefficients of the frequency bands exclusive of the MRA (hereinafter, referred to as MRR) among the plurality of frequency bands; and
   a band synthesis portion operable to reconstruct the digital image signal in which the information has been embedded by using the MRA and the MRR to which data embedding processing is subjected,
   wherein a set value T and a set value m are predetermined and q is predetermined as a value obtained by dividing a transform coefficient by a predetermined quantization step size,
   wherein said authentication data embedding portion embeds the authentication data in each transform coefficient of the MRR by comparing an absolute value of the transform coefficient with the set value T, and if the absolute value is less than the set value T, setting the transform coefficient to the set value +m or −m depending on a bit value of the authentication data to be embedded, and if the absolute value is not less than the set value T, setting the transform coefficient to an even or odd integer nearest to the value q depending on the bit value of the authentication data to be embedded, and
   wherein T is a positive integer and m is an integer not more than T.

2. A tamper detecting apparatus for detecting tamper with a digital image based on tamper-detection-information embedded by a specific apparatus in a digital image signal, said tamper detecting apparatus comprising:
   a band division portion operable to divide the digital image signal into a plurality of frequency bands;
   a key data extraction portion operable to extract key data embedded by the specific apparatus from transform coefficients of a lowest frequency band (hereinafter, referred to as MRA) among the plurality of frequency bands;
   an authentication data generation portion operable to generate a pseudo-random number series by using the key data, and to generate authentication data from the pseudo-random number series;
   an embedded information extraction portion operable to extract embedded information embedded based on the key data by the specific apparatus from transform coefficients of the frequency bands exclusive of the MRA (hereinafter, referred to as MRR) among the plurality of frequency bands; and
   a tamper determination portion operable to compare the embedded information with the authentication data for verification and to determine whether the digital image has been tampered with,
   wherein a set value T is predetermined and q is predetermined as a value obtained by dividing a transform coefficient by a predetermined quantization step size and then rounding off the result,
   wherein said embedded information extraction portion extracts the embedded information from each transform coefficient of the MRR by comparing an absolute value of the transform coefficient with the set value T, and if the absolute value is less than the set value T, determining whether a value of the transform coefficient is positive or negative and extracting a bit value of embedded information embedded in the transform coefficient based on the determination, and if the absolute value is not less than the set value T, determining whether the value q is even or odd and extracting a bit value of embedded information embedded in the transform coefficient based on the determination, and
   wherein T is a positive integer.

3. A tamper detecting apparatus for detecting tamper with a digital image based on tamper-detection-information embedded by a specific apparatus in a digital image signal, said tamper detecting apparatus comprising:
   a band division portion operable to divide the digital image signal into a plurality of frequency bands;
   a key data extraction portion operable to extract key data embedded by the specific apparatus from transform coefficients of a lowest frequency band (hereinafter, referred to as MRA) among the plurality of frequency bands;
   an authentication data generation portion operable to generate a pseudo-random number series by using the key data, and to generate authentication data from the pseudo-random number series;
   an embedded information extraction portion operable to extract embedded information embedded based on the key data by the specific apparatus from transform coefficients of the frequency bands exclusive of the MRA (hereinafter, referred to as MRR) among the plurality of frequency bands; and
   a tamper determination portion operable to compare the embedded information with the authentication data for verification and to determine whether the digital image has been tampered with,
   wherein said tamper determination portion comprises:
   a block division portion operable to divide the digital image into a plurality of unit blocks each composed of a predetermined number of pixels,
   a regional embedded information read portion operable to read, for each of the unit blocks, embedded information embedded in the transform coefficients of the MRR that represents the same spatial region as the unit block, serially from all of the embedded information extracted by said embedded information extraction portion;
   a regional authentication data read portion operable to read, for each of the unit blocks, authentication data corresponding in position to the embedded information serially read by said regional embedded information read portion, serially from all of the authentication data generated by said authentication data generation portion; and a block-tamper determination portion operable to compare the embedded information serially read with the authentication data serially read and to determine, for each of the unit blocks, whether the digital image has been tampered with, wherein a set value T is predetermined and q is predetermined as a value obtained by dividing a transform coefficient by a predetermined quantization step size and then rounding off the result, wherein said embedded information extraction portion extracts the embedded information from each transform coefficient of the MRR by comparing an absolute value of the transform coefficient with the set value T, and if the absolute value is less than the set value T, determining whether a value of the transform coefficient is positive or negative and extracting a bit value of embedded information embedded in the transform coefficient based on the determination, and if the absolute value is not less than the set value T, determining whether the value q is even or odd and extracting a bit value of embedded information embedded in the transform coefficient based on the determination, and wherein T is a positive integer.

4. A tamper-detection-information embedding method of embedding predetermined information for tamper detection in a digital image signal, said method comprising:

dividing the digital image signal into a plurality of frequency bands;

generating a pseudo-random number series by using predetermined key data, and generating authentication data from the pseudo-random number series;

embedding the key data in transform coefficients of a lowest frequency band (hereinafter, referred to as MRA) among the plurality of frequency bands;

embedding the authentication data in transform coefficients of the frequency bands exclusive of the MRA (hereinafter referred to as MRR) among the plurality of frequency bands; and reconstructing the digital image signal in which the information has been embedded by using the MRA and the MRR to which data embedding processing is subjected, wherein a set value T and a set value m are predetermined and q is predetermined as a value obtained by dividing a transform coefficient by a predetermined quantization step size, wherein embedding authentication data includes comparing an absolute value of the transform coefficient with the set value T;

setting the transform coefficient to the set value +m or −m depending on a bit value of the authentication data to be embedded if the absolute value is less than the set value T, and setting the transform coefficient to an even or odd integer nearest to the value q depending on the bit value of the authentication data to be embedded if the absolute value is not less than the set value T, and wherein T is a positive integer and m is an integer not more than T.

5. A tamper detecting method of detecting tamper with a digital image based on tamper-detection-information embedded by a specific apparatus in a digital image signal, said method comprising:

dividing the digital image signal into a plurality of frequency bands;

extracting key data embedded by the specific apparatus from transform coefficients of a lowest frequency band (hereinafter, referred to as MRA) among the plurality of frequency bands;

generating a pseudo-random number series by using the key data, and generating authentication data from the pseudo-random number series;

extracting embedded information embedded based on the key data by the specific apparatus from transform coefficients of the frequency bands exclusive of the MRA (hereinafter, referred to as MRR) among the plurality of frequency bands; and comparing the embedded information with the authentication data for verification and determining whether the digital image has been tampered with, wherein a set value T is predetermined and q is predetermined as a value obtained by dividing a transform coefficient by a predetermined quantization step size and then rounding off the result, wherein said extracting embedded information includes comparing an absolute value of the transform coefficient with the set value T, determining whether a value of the transform coefficient is positive or negative if the absolute value is less than the set value T, and extracting a bit value of embedded information embedded in the transform coefficient based on the determination, and determining whether the value q is even or odd if the absolute value is not less than the set value T, and extracting a bit value of embedded information embedded in the transform coefficient based on the determination, and wherein T is a positive integer.

6. A tamper detecting method of detecting tamper with a digital image based on tamper-detection-information embedded by a specific apparatus in a digital image signal, said method comprising:

dividing the digital image signal into a plurality of frequency bands;

extracting key data embedded by the specific apparatus from transform coefficients of a lowest frequency band (hereinafter, referred to as MRA) among the plurality of frequency bands;

generating a pseudo-random number series by using the key data, and generating authentication data from the pseudo-random number series;

extracting embedded information embedded based on the key data by the specific apparatus from transform coefficients of the frequency bands exclusive of the MRA (hereinafter, referred to as MRR) among the plurality of frequency bands;

comparing the embedded information with the authentication data for verification and determining whether the digital image has been tampered with;

dividing the digital image into a plurality of unit blocks each composed of a predetermined number of pixels;

reading, for each of the unit blocks, embedded information embedded in the transform coefficients of the MRR that represents the same spatial region as the unit block, serially from all of the embedded information;

reading, for each of the unit blocks, authentication data corresponding in position to the embedded information serially read, serially from all of the authentication data; and comparing a series of the embedded information serially read with a series of the authentication data serially read and determining, for each of the unit blocks, whether the digital image has been tampered with, wherein a set value T is predetermined and q is predetermined as a value obtained by dividing a transform coefficient by a predetermined quantization step size and then rounding off the result, wherein said extracting embedded information includes comparing an absolute value of the transform coefficient with the set value T, determining whether a value of the transform coefficient is positive or negative if the absolute value is less than the set value T, and extracting a bit value of embedded information embedded in the transform coefficient based on the determination, and determining whether the value q is even or odd if the absolute value is not less than the set value T, and extracting a bit value of embedded information embedded in the transform coefficient based on the determination, and wherein T is a positive integer.

7. A recording medium on which a program having computer device readable instructions to be run on a computer device is recorded for carrying out a tamper-detection-information embedding method of embedding predetermined information for tamper detection in a digital image signal, the computer device readable instructions including instructions capable of instructing a computer device to perform the method comprising:

dividing the digital image signal into a plurality of frequency bands;

generating a pseudo-random number series by using predetermined key data, and generating authentication data from the pseudo-random number series;

embedding the key data in transform coefficients of a lowest frequency band (hereinafter, referred to as MRA) among the plurality of frequency bands;

embedding the authentication data in transform coefficients of the frequency bands exclusive of the MRA (hereinafter referred to as MRR) among the plurality of frequency bands; and reconstructing the digital image signal in which the information has been embedded by using the MRA and the MRR to which data embedding processing is subjected, wherein a set value T and a set value m are predetermined and q is predetermined as a value obtained by dividing a transform coefficient by a predetermined quantization step size, wherein said embedding authentication data includes:

comparing an absolute value of the transform coefficient with the set value T, setting the transform coefficient to the set value +m or −m depending on a bit value of the authentication data to be embedded if the absolute value is less than the set value T, and setting the transform coefficient to an even or odd integer nearest to the value q depending on the bit value of the authentication data to be embedded if the absolute value is not less than the set value T, and wherein T is a positive integer and m is an integer not more than T.

8. A recording medium on which a program having computer device readable instructions to be run on a computer device is recorded for carrying out a tamper detecting method of detecting tamper with a digital image based on tamper-detection-information embedded by a specific apparatus in a digital image signal, the computer device readable instructions including instructions capable of instructing a computer device to perform the method comprising:

dividing the digital image signal into a plurality of frequency bands;

extracting key data embedded by the specific apparatus from transform coefficients of a lowest frequency band (hereinafter, referred to as MRA) among the plurality of frequency bands;

generating a pseudo-random number series by using the key data, and generating authentication data from the pseudo-random number series;

extracting embedded information embedded based on the key data by the specific apparatus from transform coefficients of the frequency bands exclusive of the MRA (hereinafter referred to as MRR) among the plurality of frequency bands; and comparing the embedded information with the authentication data for verification and determining whether the digital image has been tampered with, wherein a set value T is predetermined and q is predetermined as a value obtained by dividing a transform coefficient is divided by a predetermined quantization step size and then rounding off the result, wherein said extracting embedded information includes comparing an absolute value of the transform coefficient with the set value T, determining whether a value of the transform coefficient is positive or negative if the absolute value is less than the set value T, and extracting a bit value of embedded information embedded in the transform coefficient based on the determination, and determining whether the value q is even or odd if the absolute value is not less than the set value T, and extracting a bit value of embedded information embedded in the transform coefficient based on the determination, and wherein T is a positive integer.

9. A recording medium on which a program having computer device readable instructions to be run on a computer device is recorded for carrying out a tamper detecting method of detecting tamper with a digital image based on tamper-detection-information embedded by a specific apparatus in a digital image signal, the computer device readable instructions including instructions capable of instructing a computer device to perform the method comprising:

dividing the digital image signal into a plurality of frequency bands;

extracting key data embedded by the specific apparatus from transform coefficients of a lowest frequency band (hereinafter, referred to as MRA) among the plurality of frequency bands;

generating a pseudo-random number series by using the key data, and generating authentication data from the pseudo-random number series;

extracting embedded information embedded based on the key data by the specific apparatus from transform coefficients of the frequency bands exclusive of the MRA (hereinafter, referred to as MRR) among the plurality of frequency bands;

comparing the embedded information with the authentication data for verification and determining whether the digital image has been tampered with, dividing the digital image into a plurality of unit blocks each composed of a predetermined number of pixels;

reading, for each of the unit blocks, embedded information embedded in the transform coefficients of the MRR that represents the same spatial region as the unit block, serially from all of the embedded information;

reading, for each of the unit blocks, authentication data corresponding in position to the embedded information serially read, serially from all of the authentication data; and comparing a series of the embedded information serially read with a series of the authentication data serially read and determining, for each of the unit blocks, whether the digital image has been tampered with, wherein a set value T is predetermined and q is predetermined as a value obtained by dividing a transform coefficient by a predetermined quantization step size and then rounding off the result, wherein said extracting embedded information includes comparing an absolute value of the transform coefficient with the set value T, determining whether a value of the transform coefficient is positive or negative if the absolute value is less than the set value T, and extracting a bit value of embedded information embedded in the transform coefficient based on the determination, and determining whether the value q is even or odd if the absolute value is not less than the set value T, and extracting a bit value of embedded information embedded in the transform coefficient based on the determination, and wherein T is a positive integer.

* * * * *